United States Patent [19]

Pitts et al.

[11] Patent Number: 4,893,248

[45] Date of Patent: Jan. 9, 1990

[54] MONITORING AND REPORTING SYSTEM FOR REMOTE TERMINALS

[75] Inventors: W. Hampton Pitts; Ronald G. Thomas, both of Nashville, Tenn.

[73] Assignee: Access Corporation, Nashville, Tenn.

[21] Appl. No.: 11,976

[22] Filed: Feb. 6, 1987

[51] Int. Cl.$^4$ .................... H04H 9/00; G06F 15/20

[52] U.S. Cl. .................. 364/464.01; 358/84; 358/86; 364/550; 379/92; 379/106; 455/2; 455/4; 455/5

[58] Field of Search ............. 340/526, 825.06, 825.07, 340/825.08, 825.15, 825.31, 825.5, 825.35; 358/84, 85, 86; 379/65, 66, 106, 92; 364/550, 464.01; 380/23; 455/2, 4, 5

[56] References Cited

U.S. PATENT DOCUMENTS

| | | | |
|---|---|---|---|
| Re. 31,735 | 11/1984 | Davidson | 380/17 |
| 3,588,357 | 6/1971 | Sellari, Jr. | 379/107 |
| 3,911,204 | 10/1975 | Spinelli | 380/13 |
| 3,968,327 | 7/1976 | Gregg, III | 455/4 X |
| 3,987,246 | 10/1976 | Willis | 379/106 |
| 4,008,369 | 2/1977 | Theurer et al. | 358/84 |
| 4,104,486 | 8/1978 | Martin et al. | 340/825.38 X |
| 4,126,762 | 11/1978 | Martin et al. | 379/106 |
| 4,163,254 | 7/1979 | Block et al. | 380/19 X |
| 4,225,884 | 9/1980 | Block et al. | 358/84 X |
| 4,241,237 | 12/1980 | Paraskevakos et al. | 379/102 |
| 4,245,245 | 1/1981 | Matsumoto et al. | 358/84 X |
| 4,258,386 | 3/1981 | Cheung | 358/84 |
| 4,361,851 | 11/1982 | Asip et al. | 455/5 X |
| 4,381,522 | 4/1983 | Lambert | 455/5 X |
| 4,394,540 | 7/1983 | Willis et al. | 379/104 |
| 4,418,424 | 11/1983 | Kawamoto et al. | 455/4 |
| 4,484,217 | 11/1984 | Block et al. | 358/84 |
| 4,486,773 | 12/1984 | Okubo | 455/5 X |
| 4,528,589 | 7/1985 | Block et al. | 358/84 X |
| 4,533,949 | 8/1985 | Fujimura et al. | 380/5 |
| 4,554,579 | 11/1985 | Citta | 358/86 |
| 4,558,464 | 12/1985 | O'Brien, Jr. | 455/5 X |
| 4,566,030 | 1/1986 | Nickerson et al. | 379/92 |
| 4,577,224 | 3/1986 | Ost | 380/20 |
| 4,584,602 | 4/1986 | Nakagawa | 379/92 |
| 4,590,516 | 5/1986 | Abraham | 358/86 |
| 4,616,263 | 10/1986 | Eichelberger | 358/185 |
| 4,630,108 | 12/1986 | Gomersall | 358/84 |
| 4,712,238 | 12/1987 | Gilhousen et al. | 358/84 X |
| 4,759,060 | 7/1988 | Hayashi et al. | 455/2 X |
| 4,833,710 | 5/1989 | Hirashima | 455/2 X |

Primary Examiner—Parshotam S. Lall
Assistant Examiner—Edward R. Cosimano
Attorney, Agent, or Firm—Neuman, Williams, Anderson & Olson

[57] ABSTRACT

A system is disclosed for monitoring and accumulating data indicative of viewer authorized pay per view TV programs at each of a plurality of remote terminals, wherein each remote terminal is coupled illustratively by non-dedicated telephone lines to a host computer at a central station. The remote terminal includes viewer actuable means for authorizing the viewing of a pay per TV program, a memory, means responsive to the authorizing of a program for storing data indicative of the authorized program into the memory, and means responsive to the authorizing of the pay per view TV program for transmitting over the telephone lines to the host computer a report message including the program data. Security features are adopted for the remote terminal of this invention to prevent the viewer interference with the monitoring and/or reporting of the report message to the host computer as by removing energization from the remote terminal and/or disconnecting the telephone lines from the remote terminal. Further, the viewer is given a preview of an authorized pay per view program, whereby the viewer will be billed for that program only if the viewer views the authorized program for a time greater than a preview period. In order to prevent a viewer from taking advantage of this monitoring and reporting system, the time of each authorizing and deauthorizing is noted and stored in memory, whereby each viewing segment between successive authorizings and deauthorizings may be calculated and stored in a total viewing time memory. Each viewer is also given a credit limit illustratively as the number of pay per view TV programs that will be authorized before further authorizing is defeated and it is necessary to update that credit limit. The remote terminal at call-in time transmits a report message to the host computer, which checks the viewer's credit and, if satisfactory, transmits or downloads a new credit limit to the remote terminal, thus permitting further authorizing of pay per view programs.

62 Claims, 15 Drawing Sheets

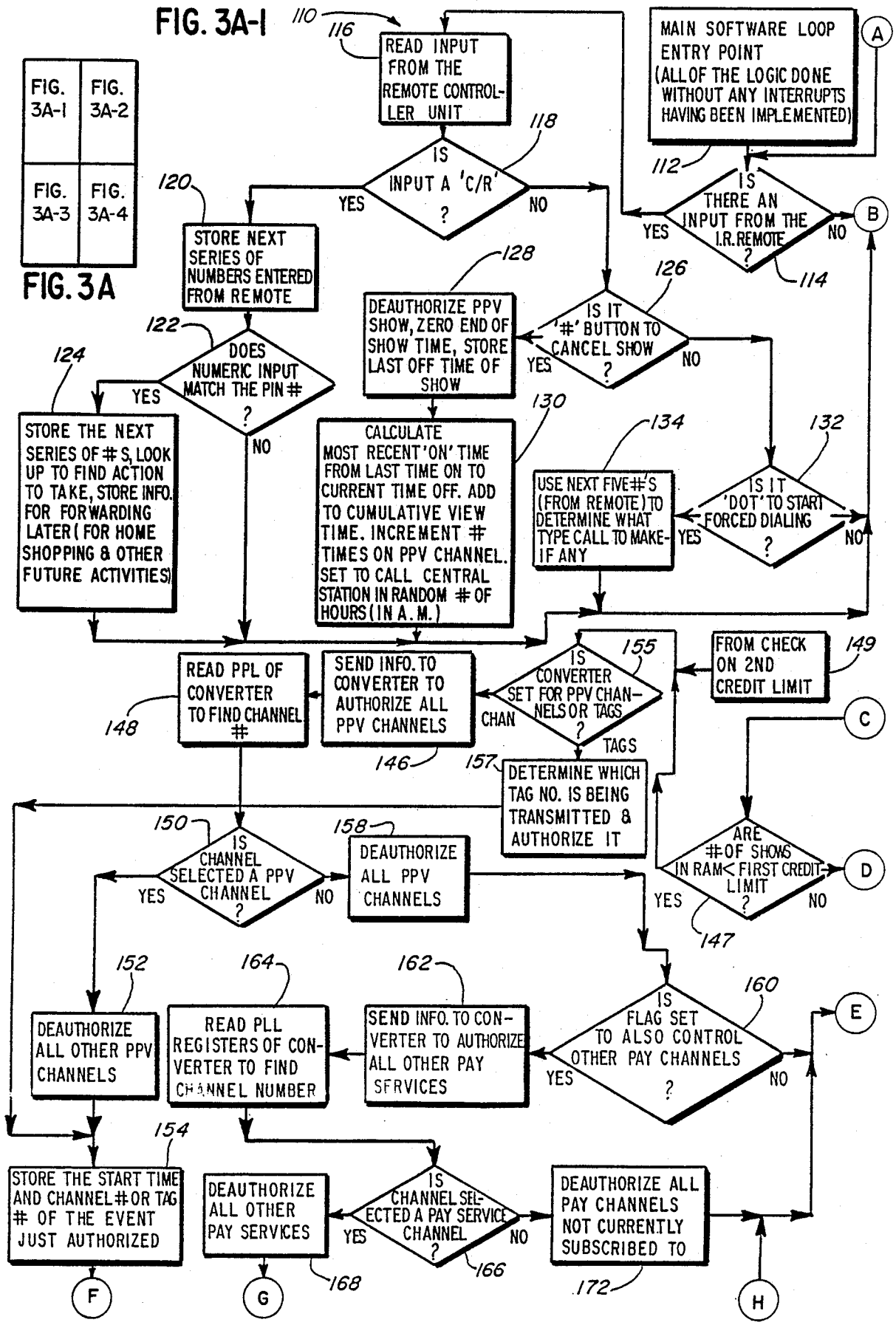

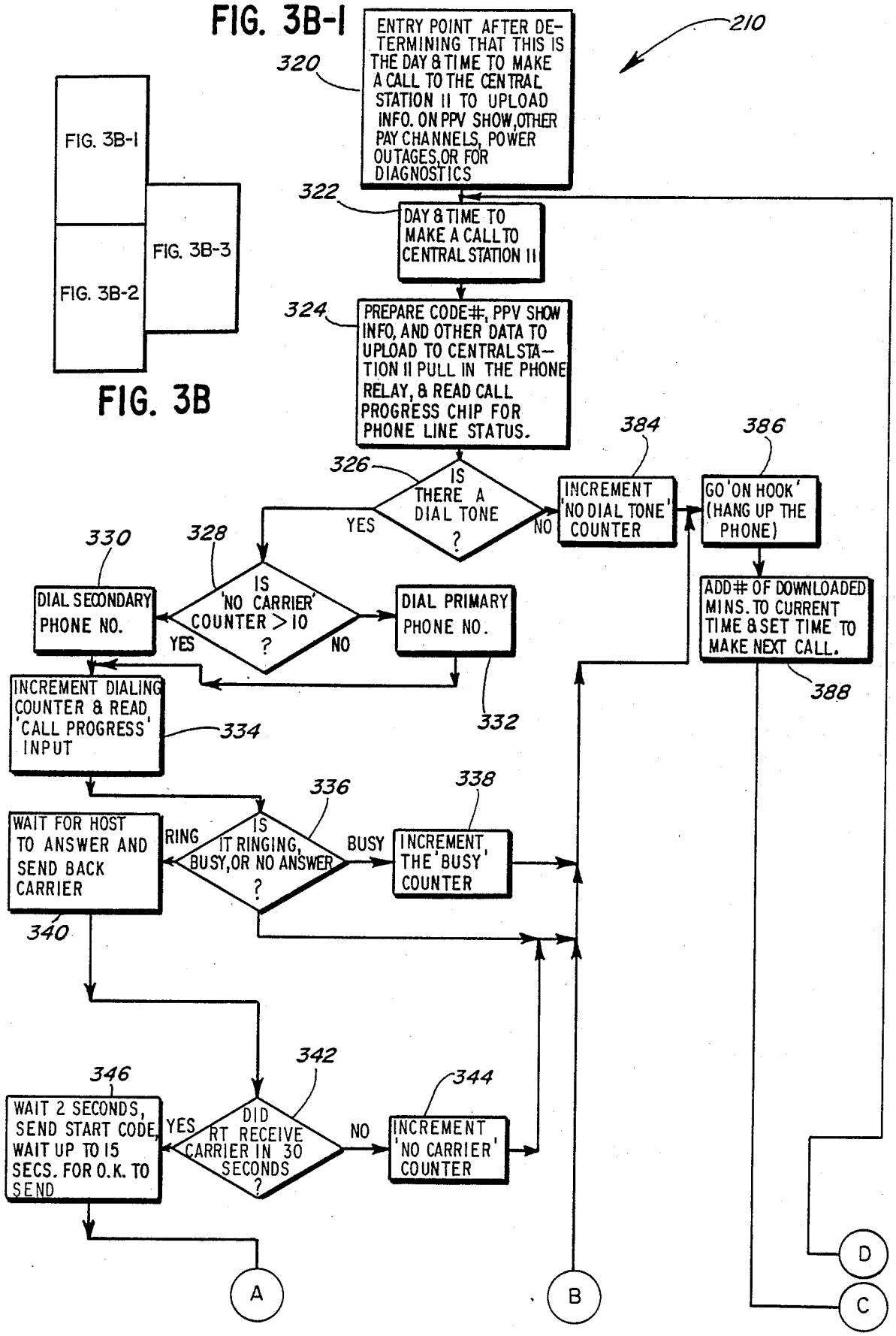

MONITORING AND REPORTING SYSTEM FOR REMOTE TERMINALS

BACKGROUND OF THE INVENTION

1. Field of the Invention

This invention relates to a secure system comprise of a plurality of remote terminals and at least one central station for receiving data monitored and reported by each of the remote terminals. In particular, this invention relates in one illustrative embodiment thereof to a system of remote terminals, which monitors and accumulates data relating to pay per view television programs that have been authorized at the remote terminal and, thereafter, reports such program data in a secure fashion as will prevent potential interference or interception by a viewer at the remote terminal.

2. Description Of The Prior Art

There are many applications for monitoring and reporting systems from a plurality of remote terminals. In the absence of such systems, the accumulation of data or the periodic monitoring of conditions at a large number of diversely located remote terminals would be a time consuming and expensive job if accomplished by readers traveling to each location. It is thus desirable to accumulate such data at a central location without the necessity of traveling to each terminal and with a minimum of human intervention. Typically, such systems have been employed to monitor utility consumption, e.g. water, gas, and/or electricity, in private homes or commercial establishments. At each such remote location, a terminal is disposed with sensors or monitors particularly adapted for monitoring an activity at that remote location, storing the monitored data and subsequently reporting the accumulated data on a periodic basis to a centrally disposed station. A host computer is typically disposed at the central station for receiving reports from each of the remote terminals and for using the reported data to bill the customer for the rendered services or consumption.

In an illustrative embodiment of this invention, this secure system relates to a pay per view television (TV) system which monitors each TV program that a viewer at the remote terminal authorizes and, thereafter, reports to the host computer data indicative of the authorized programs and a code identifying the remote terminal and viewer. In addition, it may be desirable to report the actual viewing time, as well as to identify the particular viewed program or a channel on which a particular pay per view program was transmitted.

As described in "PAY-PER-VIEW: THE LOGISTICS, Alternative Pay-Per-View Technologies: A Load Capacity Analysis," by Shellie Rosser, *CABLE MARKETING*, June 1986, there are two types of pay per view systems: real time and non-real time systems. Real time systems require that a prospective viewer must first place an order with the central station to authorize the selected program. Such a preorder may be placed over a conventional, non-dedicated telephone line or a dedicated cable interconnecting the remote terminal and the central station. The central station responds to the preorder and forwards an enabling message addressed the particular remote terminal from which the selected program was ordered.

An inherent limitation in such real time systems lies in the capacity of the central station to receive and process program preorders in that interval of time immediately proceeding the program transmission time. In real time systems where telephone lines are employed, human operators can handle typically one order per minute, thus significantly limiting those "impulse buyers" who decide at the last minute to view a particular, pay per view TV program. To in part overcome the limitations of a human operator, some real time systems employ automated voice-response apparatus at the central station, which recognizes the tones transmitted from a conventional dual tone modulated frequency (DTMF) tone dialing phone. However, human operators must still handle orders received from viewers without DTMF tone dialing phones.

Even with such automated equipment, the host computer at the central station must perform a credit check and, if good, download the viewer s telephone and account numbers to an addressable controller, which in turn transmits the enabling message to the ordering remote terminal. Such real time systems may be further streamlined by employing an auto-dialer at the remote terminal, whereby the order is automatically transmitted to the central station. Alternative to the use of conventional telephone transmission lines is the use of two-way cable systems, which are capable of transmitting TV program orders at an exceptionally high speed from the remote terminal to the central station. The improved capability of these real time systems is achieved at greater and greater expense as automated apparatus is employed at the remote terminals and at the central station, or as a two-way cable system is employed instead of a conventional telephone transmission line.

In a non-real time system, it is not necessary to transmit first a preorder to a central station. Rather, the viewer actuates a remote terminal, whereby a decoding or descraming apparatus at the remote terminal authorizes or permits access to the selected pay per view TV program as transmitted to the r<mote terminal on a cable. Thus, the viewer may authorize a selected TV program and have it immediately descrambled and available for viewing without delaying to communicate with the central station. Once selected and authorized, data identifying the selected pay per view TV program is stored in the terminal's memory. At a later time, the remote terminal transmits a report message to the central station by a second cable, or by a conventional telephone transmission line.

Examples of non-real time pay per view TV systems are provided by U.S. Pat. No. 4,361,851 of Asip et al. and U.S. Pat. No. 4,104,486 of Martin et al. The Asip et al. system is implemented by a microprocessor, and a memory for storing the time of day and channel identification of an authorized pay per view TV program. The Asip et al. system also includes a telephone interface for determining if the viewer's telephone is in use or free. At selected times controlled by a real-time clock, the remote terminal of Asip et al. initiates a call to a central station to report periodically the programs authorized by the viewer. If the subscriber's phone is busy, the remote terminal will initiate a call at a later time when the viewer's telephone is free. Each remote terminal and its viewer have a unique identity code, whereby the viewer may be billed. The host computer at the central station may transmit control messages to the remote terminal, e.g., transmit a message to deactivate the remote terminal if the viewer has not paid his/her bill. The Asip et al. system also includes a 24 hour real time clock that is used to transmit at predetermined intervals a report message including data indicative of the authorized program(s) and the identity code of the remote terminal to the central station. In addition, Asip et al. provides the viewer with a limited time, e.g., one minute, to preview the authorized program before charging the viewer. In particular, Asip et al. employs a transient or buffer memory for storing program authorization data and a timer in the form of a software timing loop that upon timing out causes the transfer of the program authorization data from the buffer memory, if still there, to a second memory, from which it may be transmitted to the central station.

The Martin et al. patent '486 also relates to a remote terminal for monitoring and accumulating data pertaining to the pay per view TV programs accessed at a remote terminal identified by a unique code. The remote terminal transmits a message reporting program data to a central station over non-dedicated telephone lines. A host computer at the central station receives these report messages and generates bills in accordance with the authorized programs. At each remote terminal of Martin et al., there is included a telephone dialing apparatus that upon command of a preconditioning circuit seizes a telephone line and transmits the report message. The preconditioning circuit includes one or more timers, each of which generates an output pulse at predetermined timed periodic bases, e.g., every two weeks or once a month. The output pulses serve to precondition the telephone dialing apparatus to in turn report the accumulated pay per view program data.

The advantage of a non-real time system is its ability to accommodate the impulse viewer, who at a time immediately prior to or at the beginning of a pay per view TV program wishes to authorize the viewing of that program. In contrast to real time systems wherein it is necessary to transmit a preorder to a central station to authorize the selected program, a non-real time program simply records the authorized program and reports that program and the unique code of the remote terminal at a later time to the central terminal for billing purposes. A significant problem associated with non-real time systems relates to attempts to defeat the reporting of authorized pay per view TV programs at a later time by tampering with the remote terminal. Typical of such attempts is the removal of power from the remote terminal as by unplugging the power line in the hopes that the remote terminal will be able to neither store data indicative of the authorized pay per view TV program, nor at a subsequent time to transmit a message reporting the accumulated pay per view program data to the central station.

Efforts to secure a remote terminal from attempts to prevent accurate reporting, are further complicated by the desire to provide the viewer with a preview of a particular pay per view TV program, before the viewer is charged for that program. Typically, the viewer will select that channel on which a pay per view TV program will or is currently appearing. The viewer will actuate his/her remote terminal to authorize and to descramble the program signal so that it will be displayed as an unscrambled image upon the viewer's TV set. It is desired to provide a grace or preview period of a relatively short interval in which the viewer may decide whether he/she wants to watch that program. If not, the viewer will deactuate the remote terminal, otherwise if the viewer continues to watch the program, the pay per vie TV program will be recorded and, subsequently, a report message will be forwarded to the central station reporting the authorizing and viewing of that pay per view TV program.

The Martin et al. patent '486, described above, implemented such a preview by using a temporary or buffer memory for storing a signal indicative of a pay per view TV program and if present in the buffer memory after a predetermined interval, that signal was loaded to a memory from which it would be transmitted as a return message to the central station. A viewer could use the knowledge of the length of such a preview interval to defeat the reporting of the TV program, by repeatedly authorizing and deauthorizing a particular pay per view TV program within the preview interval throughout the entire length of the program without having triggered the downloading of the pay per view TV program signal from the buffer memory of Martin et al. and, therefore, to avoid the reporting and billing for the viewed pay per view TV program.

A further scheme to defeat reporting of a viewed pay per view TV program, involves the authorization on the remote terminal of a pay per view TV program and, thereafter, removing power from the remote terminal before the end of the preview interval. Typically, the viewer will be informed of the length of the preview time by the source or promoter of the pay per view TV programs. The removal of power from the remote terminal may defeat the termination of the preview period, the generation or downloading of a signal indicating that the viewer should be charged for the authorized TV program and/or the transmission of a report message from the remote terminal to the central station.

Viewers may also attempt to avoid payment for authorized programs by disconnecting the remote terminal from their non-dedicated telephone line. For example, it is contemplated that a remote terminal such as disclosed by the Martin et al. patent '486, which transmits report messages on a predetermined periodic basis, could be easily defeated by first ascertaining such periodic basis and disconnecting the viewer's telephone from the remote terminal at those times. In addition, a viewer intending to avoid payment for authorized programs, may attempt to intercept the report message to ascertain the format and content of the message, whereby such a report message could be altered to reflect no authorized pay per view TV programs.

SUMMARY OF THE INVENTION

It is therefore an object of this invention to provide a new and improved monitoring and reporting system of remote terminals, which are secure from attempts at interfering with the monitoring and/or reporting operations of the remote terminals.

It is a more particular object of this invention to provide a new and improved non-real time system of monitoring and reporting data as illustratively relates to the authorizing and viewing of pay per view TV programs.

It is a still further object of this invention to provide new and improved non-real time monitoring and reporting systems including a plurality of remote terminals as are connected to a central station by non-dedicated telephone lines and, in particular, to provide such systems as are secured to prevent tampering with the monitoring and/or reporting functions of the remote terminals.

It is a still further object of this invention to provide new and improved secured, non-real time monitoring and reporting systems that resist tampering as would occur by removing power from the system's remote terminals and/or by disconnecting the remote terminals from their non-dedicated telephone lines.

In accordance with these and other objects of this invention, there is provided a system for monitoring and accumulating data indicative of viewer authorized pay per view TV programs at each of a plurality of remote terminals, wherein each remote terminal is coupled illustratively by non-dedicated telephone lines to a host computer at a central station. The remote terminal includes viewer actuable means for authorizing the viewing of a pay per TV program, a memory, means responsive to the authorizing of a program for storing data indicative of the authorized programs into the memory, and means responsive to the authorizing of the pay per view TV program for transmitting over the telephone lines to the host computer a report message including the program data. In a preferred embodiment of this invention, a randomly calculated call-in time is set from the end of the program or the deauthorizing of the program.

Security features are adopted for the remote terminal of this invention to prevent viewer interference with the monitoring and/or reporting of the report message to the host computer as by removing energization from the remote terminal and/or disconnecting the telephone lines from the remote terminal. A battery provides backup energization to the memory and to a real time clock if normal energization is removed. An expected end of program time is calculated at the time of authorization by calculating the sum of the current real time and a period set according to the known length of the program. When the calculated end of show time has been reached as by comparison with the real time clock, the authorized pay per view TV program is deauthorized. Further, if power is removed and then restored, the power-on time is compared with the calculated end of show time and, if greater by a predetermined period, the power-on time is adopted as the end of show time. Further, the time of a power outage, i.e., the power-off time, is noted and stored in a memory, so that upon restoration of energy to the remote terminal, the power-on time can be noted and the length of the power outage calculated as the difference between the power-on and power-off times.

In a further feature of this invention, the remote terminal is provided with means for deauthorizing a previously authorized pay per view TV program and for recording that time of deauthorizing. In this manner, the viewer may be given a preview period of an authorized pay per view program, whereby the viewer will be billed for that program only if the viewer views the authorized program for a time greater than the preview period. In order to prevent a viewer from taking advantage of this monitoring and reporting system, the time of each authorizing and deauthorizing is noted and stored in memory, whereby each viewing segment between successive authorizing and deauthorizings may be calculated and stored in a total viewing time memory. In addition, the number of deauthorizations may be counted and included with the total viewing time within the report message, which will be transmitted at the call-in time to the host computer.

In a still further feature of this invention, each viewer is given a credit limit illustratively as the number of pay per view TV programs that will be authorized before it is necessary to update that credit limit. The remote terminal at call-in time transmits a report message to the host computer, which checks the viewer's credit and, if satisfactory, transmits or downloads a new credit limit to the remote terminal, thus permitting further authorizing of pay per view programs. In addition, the remote terminal forms counters in its memories, which are incremented upon sensing no-dial tone, each attempted transmission or dialing to the host computer or the sensing of a busy signal derived from the host computer. In an illustrative embodiment of this invention, if either the credit limit and/or the number of times that no carrier tone has been sensed exceed preset limits, the remote terminal defeats the further authorizing of pay per view programs.

In a still further aspect of this invention, the remote terminal has the capacity for self-initialization, whereby data indicative of the credit limit and other data as related to the viewing of pay per view TV programs, may be downloaded from an initializing computer. Each remote terminal has stored therein a telephone number of the initializing computer and is adapted upon being first energized for accessing that number and sending a message over conventional telephone lines, requesting the downloading of the initializing data from the initializing computer. In addition, the remote terminal is adapted to periodically examine the initialization data and, if it is lost or becomes defective, to transmit a request message to the initializing computer. A request message may also be transmitted to the initializing computer, if the remote terminal is unable to connect over the telephone lines with its host computer, e.g., the remote terminal has tried a predetermined number of times without succeeding to place a telephone call to its host computer.

BRIEF DESCRIPTION OF THE DRAWINGS

A detailed description of the preferred embodiment of this invention is hereafter made with specific reference being made to the drawings, in which:

FIG. 2A shows how FIGS. 2A-1 to 2A-4 are assembled with respect to each other; and FIGS. 3A-1 to 3A-4, 3B-I to 3B-3, 3C, 3A and 3B are respectively flow diagrams of a main program, a more detailed flow diagram of an uploading/downloading subroutine of the main routine, an initialization subroutine, a showing of how FIGS. 3A-1 to 3A-4 are assembled with respect to each other, and how FIGS. 3B-1 to 3B-3 are assembled with respect to each other, all of the programs and subroutines being stored in a ROM and executed by a microprocessor of the remote terminal as illustrated in FIGS. 1A and 2A-1 to 2A-4.

DESCRIPTION OF THE PREFERRED EMBODIMENT

Figure 1A:
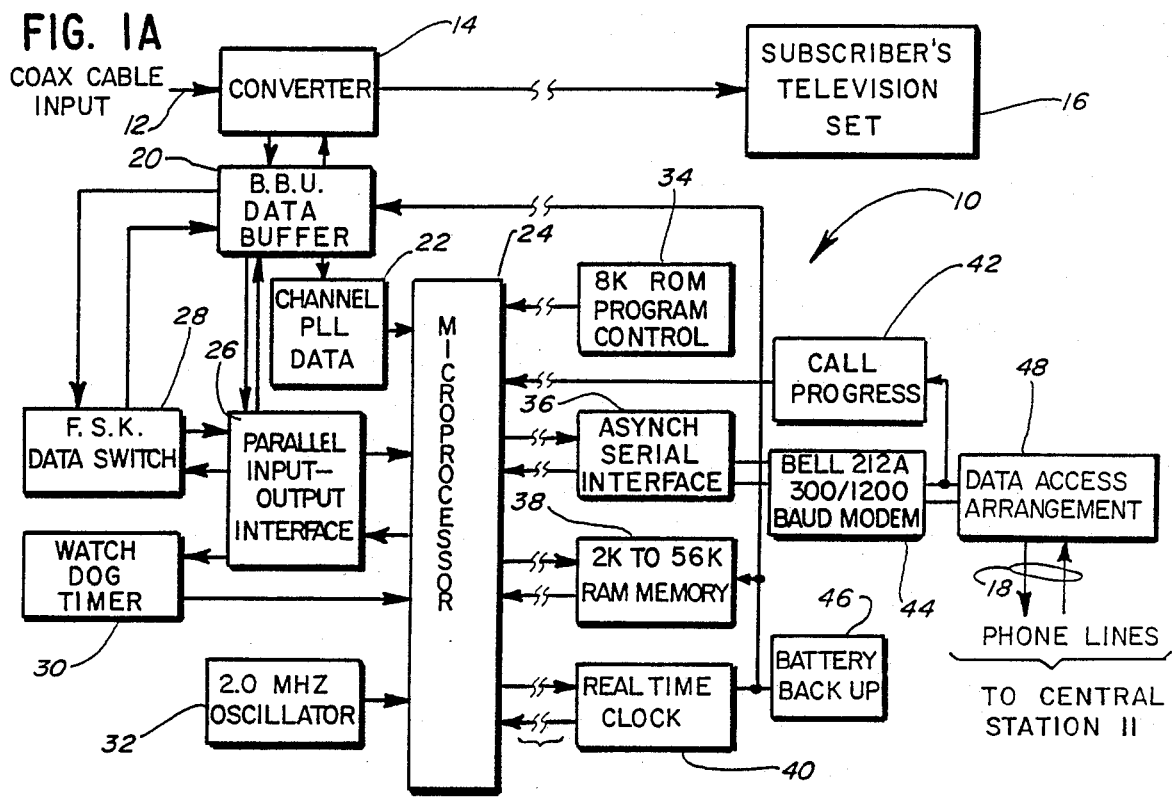
FIGS. 1A and 1B are respectively a functional block diagram of a remote terminal of the monitoring and reporting system in accordance with the teachings of this invention, and a perspective view of its converter.

Referring now to the drawings and in particular to FIG. 1A, there is shown a functional block diagram of a remote terminal 10 incorporated in a secure monitoring and reporting system in accordance with the teachings of this invention. The remote terminal 10 is coupled by ordinary telephone lines 18 to a central station 11, whereat there is disposed a host computer for receiving report messages from the remote terminal 10. In an illustrative embodiment of this invention, the remote terminal 10 is adapted to monitor and report pay per view TV programs as are authorized by a viewer at the remote terminal 10. In this illustrative embodiment, TV programs are transmitted via a coax cable 12 in an encoded, scrambled or encrypted fashion to a converter 14, which decodes, descrambles or decrypts the transmitted TV program to permit viewing of an undistorted image on a conventional television receiver or set 16. Such encryption renders it difficult for an unauthorized viewer to receive the TV program transmitted on the coax cable 12 and to display the normal video and audio portions of the TV program. There are many suitable encryption techniques which will render the transmitted TV program signal unsuitable for viewing and as such are not a part of this invention. In an illustrative embodiment of this invention, the converter 14 may take the form of that converter as manufactured by Pioneer Communications Of America, Inc. under their model number BA-5000.

Figure 1B:
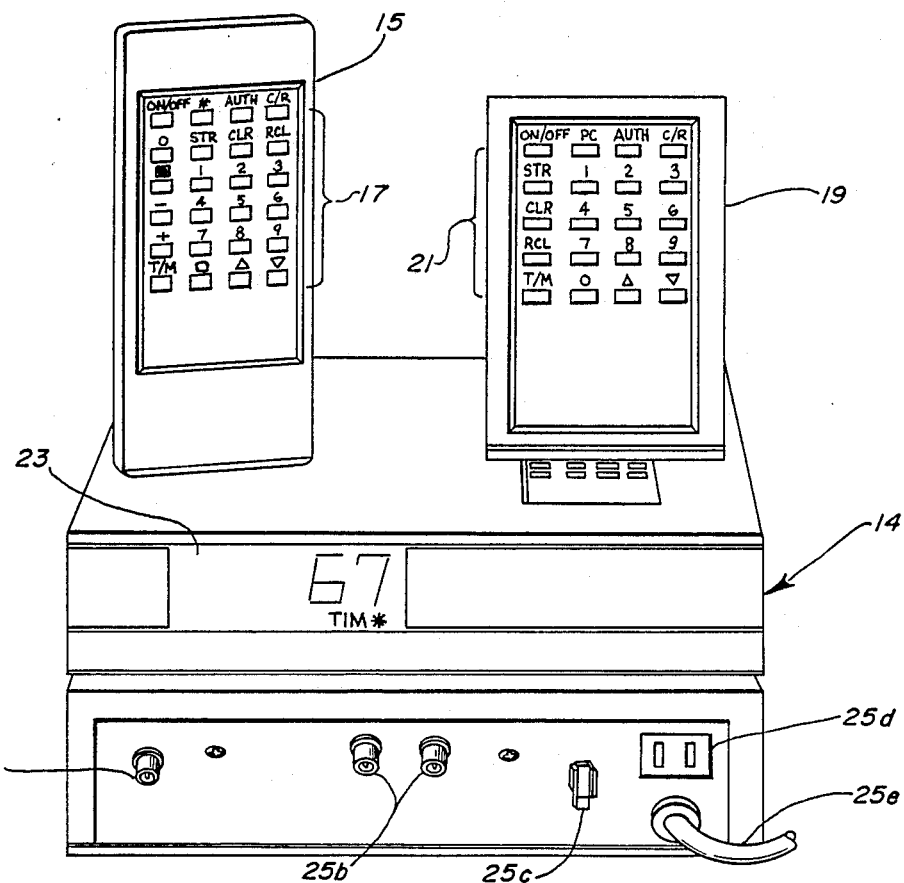

Referring now to FIG. 1B, there is shown a perspective view of the converter 14 in the illustrative form of the model BA-5000, including a remote control unit 15 with a plurality of switches or buttons on a panel 17 for actuating/deactuating the various functions of the converter 14. The converter 14 includes a similar control in the form of a key pad 19 disposed upon the top of the converter 14 and including a plurality of buttons 21. Buttons on the panels 17 and 19 with similar designations operate like functions. For example, the 0-9 buttons permit viewer entry of a particular channel or entry of the viewer's code number. The on/off button on the panel 17 permits the turning on or off the remote terminal 14. The # button on the panel 17 permits the viewer to cancel or deauthorize a Tv program after it has been authorized. The AUTH button on the panel 17 permits the viewer to authorize a particular pay per view TV program. The pay-per-view channel had been previously set by pushing selected of the 0-9 buttons on the panel 17. In particular, the actuation of the AUTH button on the panel 17 accesses a pay per view program and causes the converter 14 to decrypt the Tv program signal as transmitted via coax cable 12. A channel/response C/R button on the panel 17 permits selection of either the channel or response mode. In the channel mode, the viewer may choose either a free or pay per view program as by selecting the right channel. In the response mode, the converter 14 may be used for other functions such as ordering merchandise as may be displayed upon the television set 16 or providing response to questions as displayed upon the television set 16.

The TIM button on the panel 17 actuates the converter 14 to turn on and/or shut off at predetermined times, whereby TV programs may be viewed and/or recorded at predetermined times in the future. In particular, the turn on and shut off times are stored by actuating the 0-9 buttons on the panel 17 and then actuating the TIM button on the panel 17. The entered times may be then stored in the converter 14 by actuating the store (STR) button. On the other hand if it is desired to erase the entered times, the (CLR) button on the panel 17 is depressed. Entered turn on and shut off times may be displayed by depressing the recall (RCL) button on the panel 17. The PC button on a panel 21 on the key pad 19 permits a viewer to prevent actuation of certain pay per view or other designated channels.

At the bottom of FIG. 1B, there are shown the terminals 25 for the converter 14. For example, terminal 25a interconnects the converter 14 and the television set 16. Terminals 25b permit connection with one or more coax cables 12. Switch 25c is a parental control lock switch which may be physically held as by a pad lock to prevent access to selected pay per view or other designated channels. Terminal 25d provides an AC convenience power outlet. Energization in the form of conventional AC power is applied via line 25e to the converter 14.

As shown in FIG. 1A, the converter 14 is coupled to the remote terminal 10 and, in particular, to its data buffer 20, which is backed up by a battery. As indicated by the arrows shown in FIG. 1A, the data flow between the data buffer 20 and the converter 14 is bi-directional. As illustrated in FIG. 1A, a back-up battery 46 is employed to energize the data buffer 20, even if normal power is removed from the remote terminal 10, e.g., the power line 25e is unplugged. Without such a battery back-up 46, if power were removed from the data buffer 20, it might impose an undue load upon the converter 14 causing it to malfunction. It is desired that the converter 14 operate conventionally whether the remote terminal 10 is powered or not. The data buffer 20 receives from the converter 14 data indicative of the authentication of a particular pay per view TV program, the cancellation of a previously authorized TV program, input data indicative of the code as entered upon the 0-9 buttons on the panel 17 of the remote control unit 15, the particular channel or pay per view TV program authorized and other data as indicative of an authorization made by the viewer. Data is also received from the data buffer 20 by the converter 14, to control the operation of the converter 14. As will be explained later, there are a number of situations in which the remote terminal 10 will defeat the operation of the converter 14. For example, the viewer will be assigned a "credit limit" corresponding to the number of pay per view TV programs that the viewer will be permitted to authorize before it is necessary to communicate with the central station 11. If that "credit limit" is exceeded the remote terminal 10 will instruct the converter 14 to disable further viewing of pay per view TV programs, while permitting the viewing of the free TV programs. The remote terminal 10 can instruct the converter 14 to defeat viewing of all TV programs under certain circumstances such as where it has been determined that the viewer has attempted to defeat the monitoring and/or reporting functions of the remote terminal 10.

Figures 1, 2A:
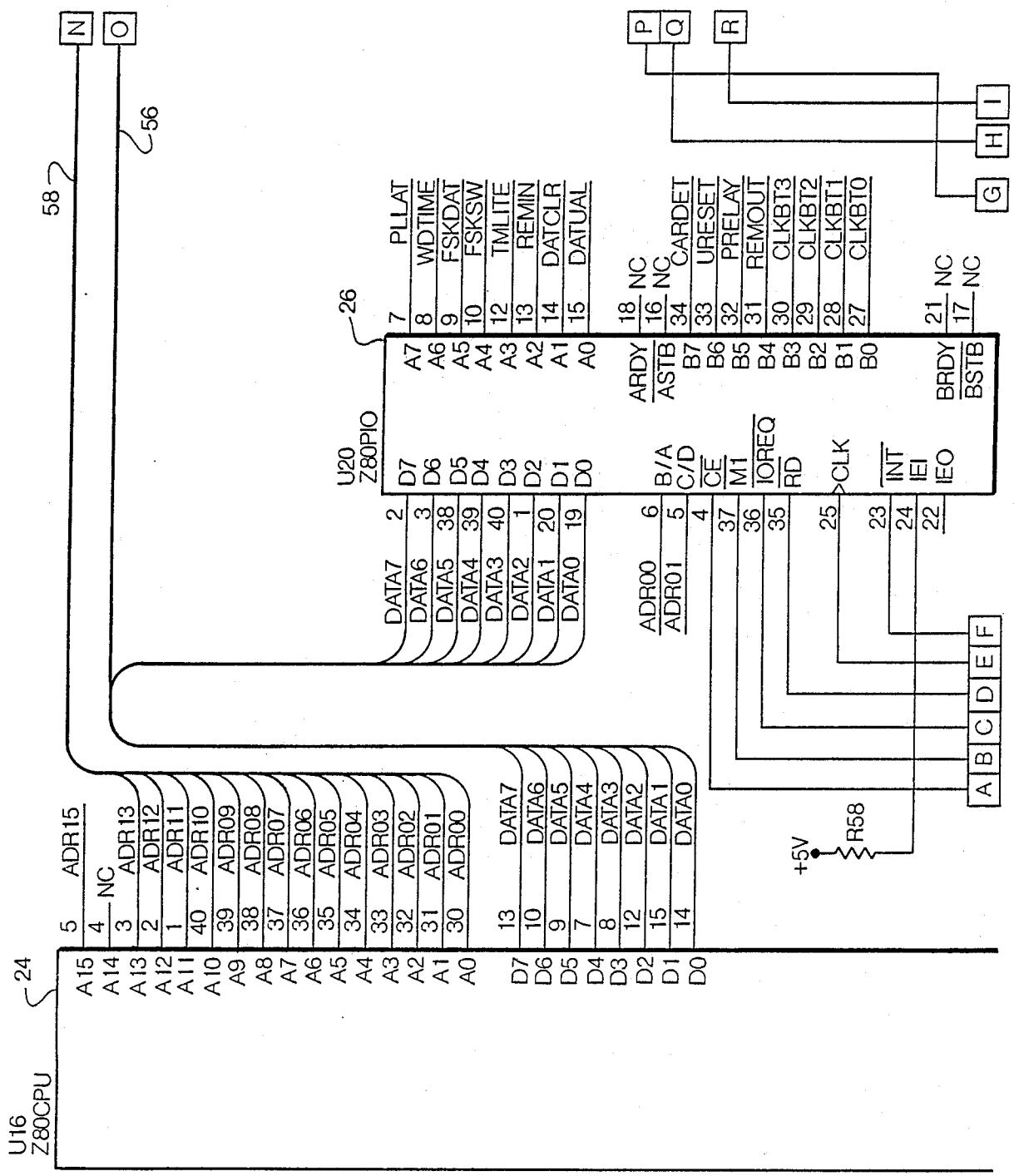
FIGS. 2A-1 to A-4, 2B and 2C are detailed, schematic drawings of the remote terminal as shown in FIG. 1A.
Figures 2, 2A:
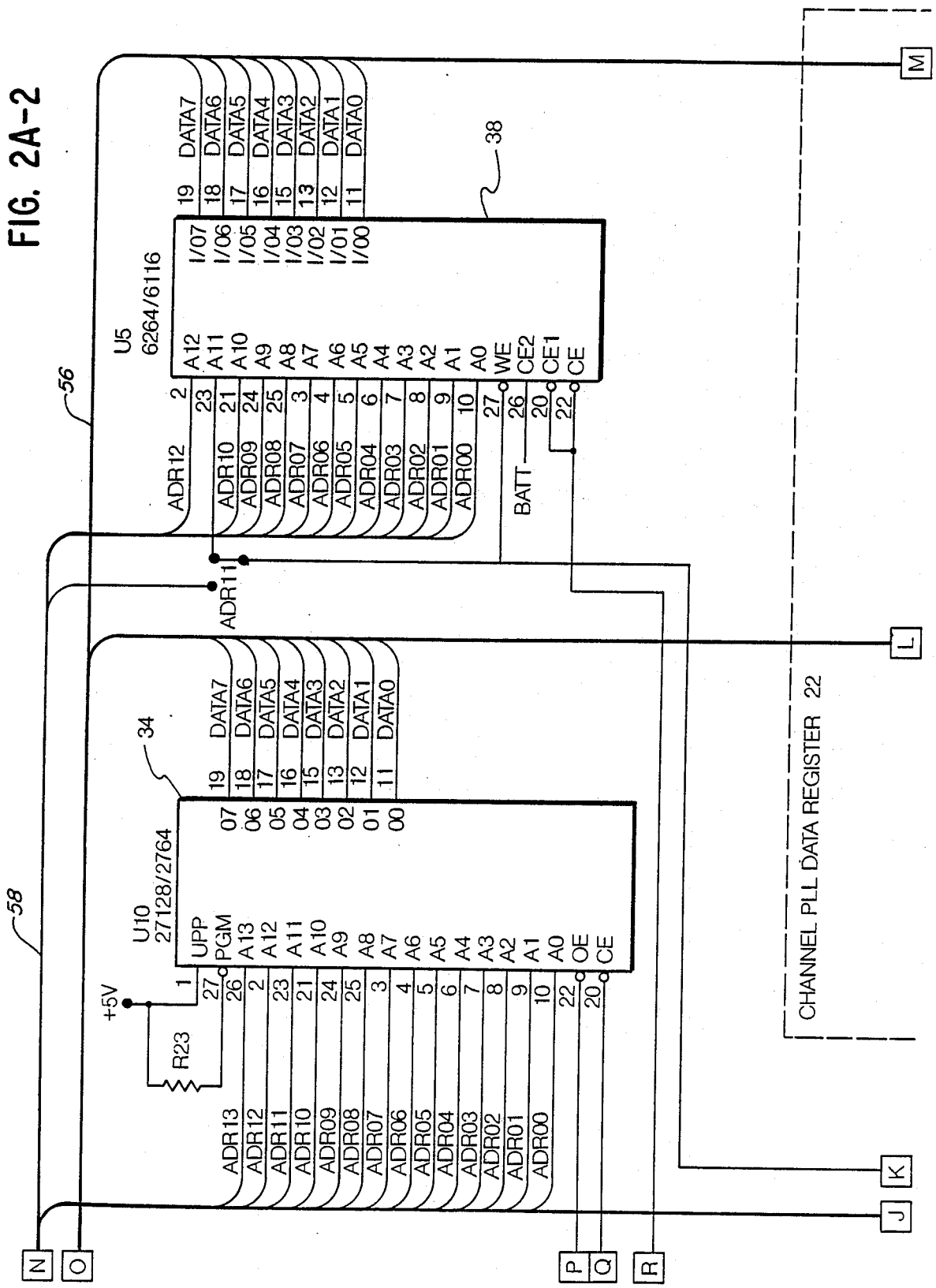
Figures 2, 2A, 3:
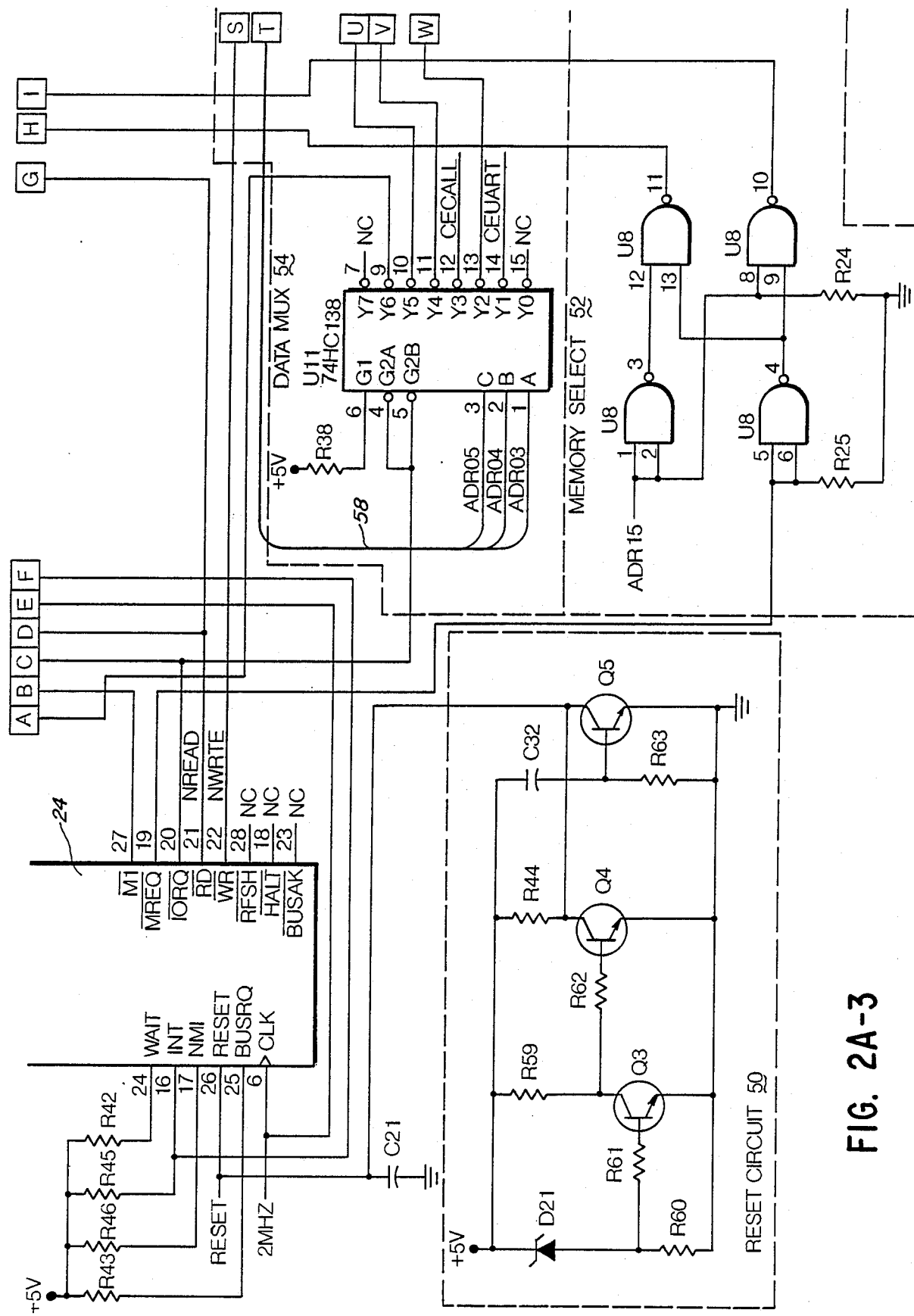
Figures 2, 2A, 3, 4:
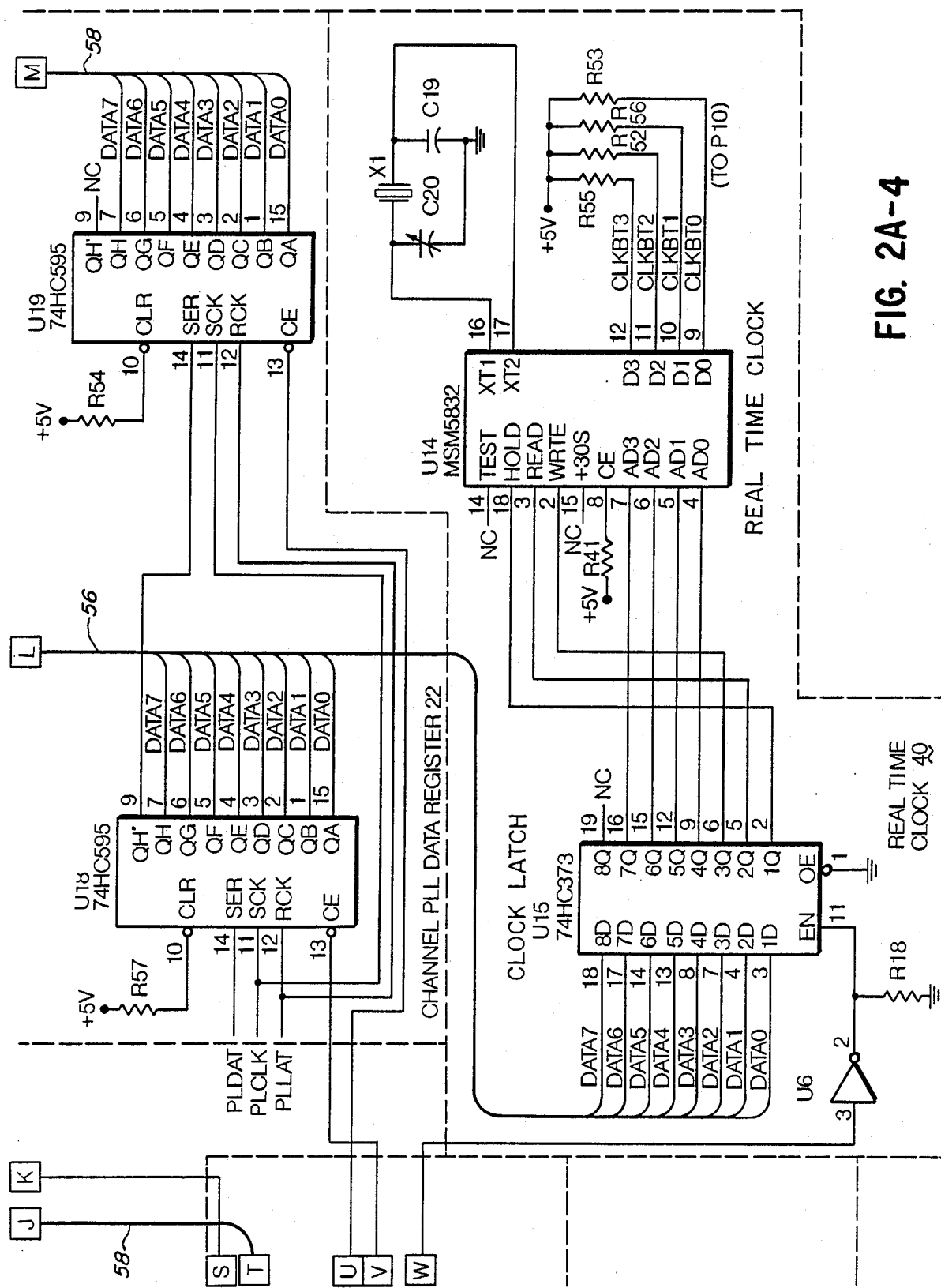
Figure 2B:
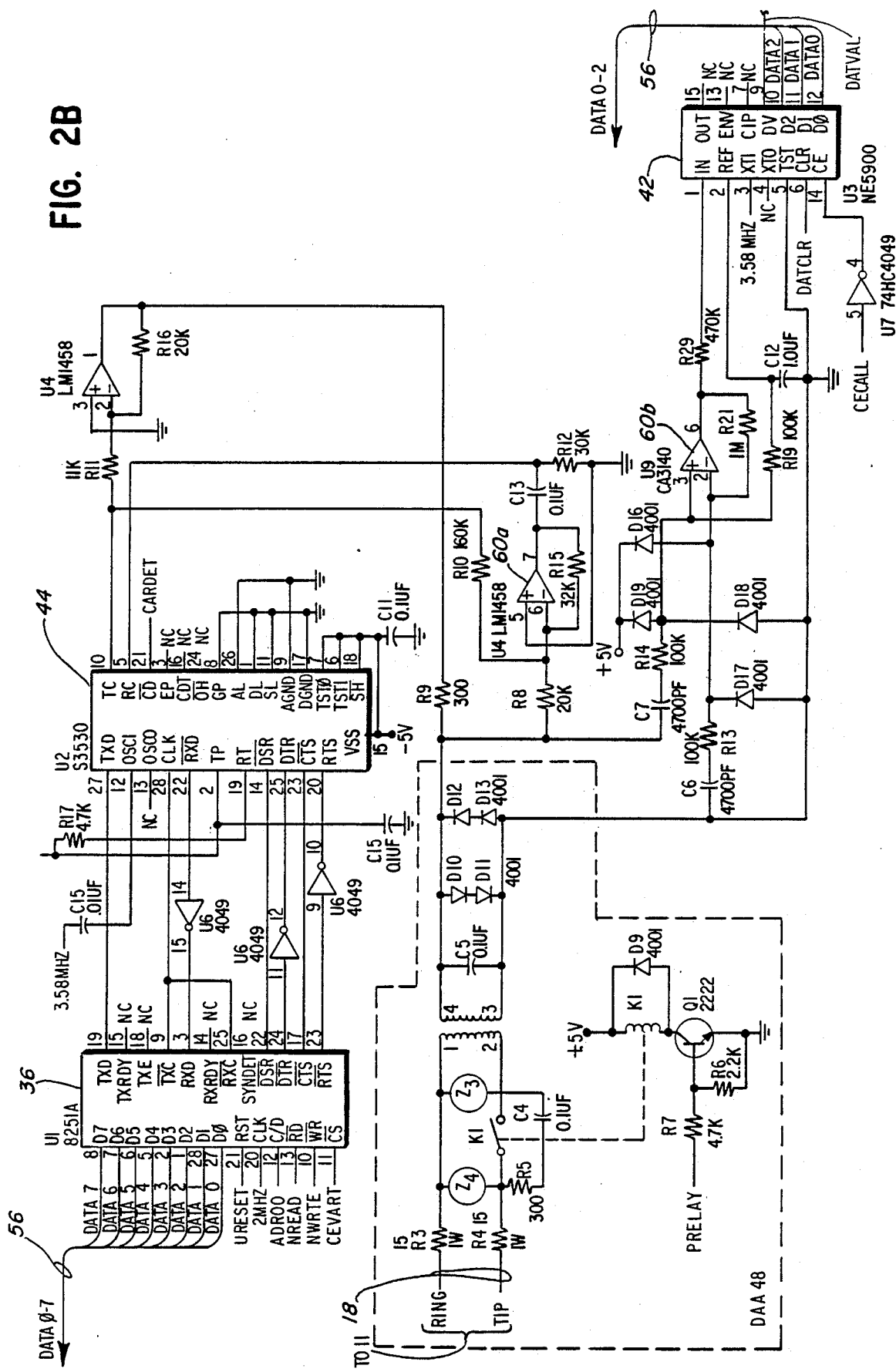
Figure 2C:
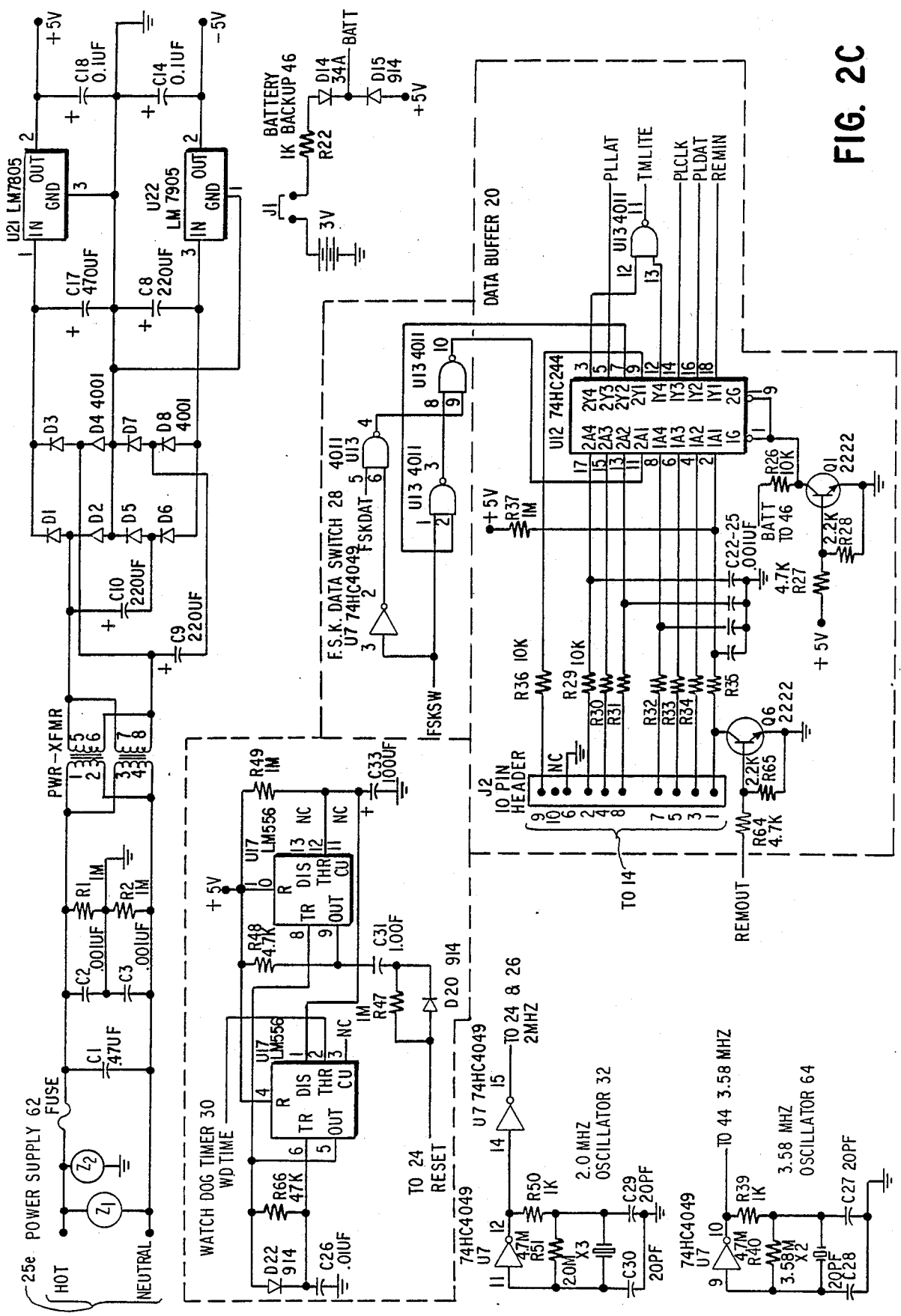

The remote terminal 10 is shown generally in the functional block diagram of FIG. 1A and in detail in the circuit schematic diagrams of FIGS. 2A, 2B and 2C. It will be appreciated that the functional block diagram of FIG. 1A will be shown in FIGS. 2 in the form of corresponding digital circuits or by sub circuits of elements and digital chips as enclosed within dotted lines, corresponding functions and elements being identified by like numbers. The remote terminal 10 includes a microprocessor having address terminals A0-A15 and data terminals D0-D7 coupled respectively by an address bus 58 and a data bus 56 to each of a parallel input-output interface 26, a random access memory (RAM) 38 and a read only memory (ROM) 34, as shown in FIGS. 1A and 2A, an asynchronous serial interface 36, and a call progress circuit 42, as shown in FIGS. 1A and 2B. The serial interface 36 is coupled to the parallel data terminals of the microprocessor 24 and converts the parallel data received from the microprocessor 24 into serial data to be applied to a modem 44. In addition, the serial interface 36 receives serial data from the modem 44 and converts it to parallel data to be applied to the microprocessor 24. Serial data is interchanged between the modem 44 and a digital acquisition adapter (DAA) 48 as is directly connected to the telephone lines 18 for receiving "RING" and "TIP" signals as are imposed upon the conventional telephone lines 18. The call progress circuit 42 is coupled to the input lines of the DAA 48 to apply a signal to the microprocessor 24, indicative of incoming data so as to inhibit the generation of output data from the microprocessor 24. A pair of operational amplifiers 60a and 60b amplify the signal appearing on the telephone lines 18 and applies the amplified signal respectively to the modem 44 and the call progress circuit 42. As will be explained in greater detail with respect to FIGS. 3, computer programs to be executed by the microprocessor 24 are stored in the ROM 34.

As best shown in FIG. 1A, the back-up battery 46 energizes not only the data buffer 20, but also the RAM 38 and a real time clock 40 in the event that normal energization is removed as by unplugging the remote terminal 10. The back-up battery 46 provides security against attempts by the viewer to defeat the monitoring and storage of pay per view TV programs by disconnecting the power line 25e. The continued energization of the RAM 38 insures that stored data indicative of authorized pay per view TV programs will be retained for later reporting, while the real time clock 40 continues to be energized to provide a signal or manifestation of the current time, which permits timing of certain events (as will be explained in detail later) that will provide an indication of viewer attempts to defeat the monitoring and reporting of pay per view TV programs. In a further embodiment of this invention, the non-volatile memory comprised of the RAM 38 and the back-up battery 46 may be replaced with an electrically erasable programmable read only memory (EEPROM) or an electrically alterable read only memory (EAROM).

A parallel input/output interface 26 interconnects the flow of data between the microprocessor 24 and the data buffer 20 to insure the orderly transfer of data in but one direction at a time. A frequency shift key (F.S.K.) data switch 28 is inserted between the data buffer 20 and the parallel I/O interface 26. The remote terminal 10 and the converter 14 may be incorporated in a system including a source of pay per view programs that also transmits upon a separate non-video channel of the cable input 12 F.S.K. command or control signals similar to that provided by the remote terminal 10. The remote terminal 10 has the capability through its F.S.K. data switch 28 either to receive such F.S.K. control signals and to reapply them to the converter 14, or upon opening the data switch 28, to apply only the command or control signals derived from the remote terminal 10, to the converter 14. The channel data register 22 is responsive to that phase lock loop (PLL) channel data as derived from the converter 14 and indicative to the channel to which the converter 14 is set, to supply such data to the microprocessor 24. A watchdog timer 30 provides a regular reset signal to the microprocessor 24, e.g., every minute, if a defeat signal is not generated in each cycle of the execution of a main program 110 (as will be explained with respect to FIG. 3A) by the microprocessor 24 and applied via the interface 26 to defeat the timing function of the watchdog timer 30. Thus, if due to a variety of circumstances primarily related to power surges, the execution of the main program 110 should become hung up, the periodic reset signal from the watchdog timer 30 will reset the microprocessor 24 returning the execution of the main program 110 to its initial instruction. Further, a 2 MHz oscillator 32 applies its clock signal to effect required timing functions of the microprocessor 24.

Referring now to FIG. 2A, a reset circuit 50 is responsive to the application of power to the remote terminal 10 and by the coupling of the power line 25e, to time a delay before releasing reset signal to the reset terminal of the microprocessor 24, thus permitting the power level as applied to the elements of the remote terminal 10 to stabilize before initiating its operation. A DATA MUX 54 is responsive to address signals applied via the address bus 58 to enable and selectively address one of the parallel input/output interface 26, the channel data register 22, the real time clock 40, the call progress circuit 42 or the serial interface 36 to transmit data with the microprocessor 24 via the data bus 56. A memory select 52 is responsive to signals from the microprocessor 24 to control whether data is read from the RAM 38 or the ROM 34. With respect to FIG. 2C, there is shown the details of a power supply 62 as coupled via the line terminal 25e to a conventional AC power source, for providing regulated levels of voltage, e.g., plus and minus 5VDC. The data buffer 20 is coupled via a transistor Q1 to the regulated output of the power supply 62 and is responsive to the removal of the regulated +5V, to disable the data buffer 20. A 3.58 MHz oscillator 64 supplies its clock signal to the modem 44 and to the call progress circuit 42.

Figures 2, 3A:
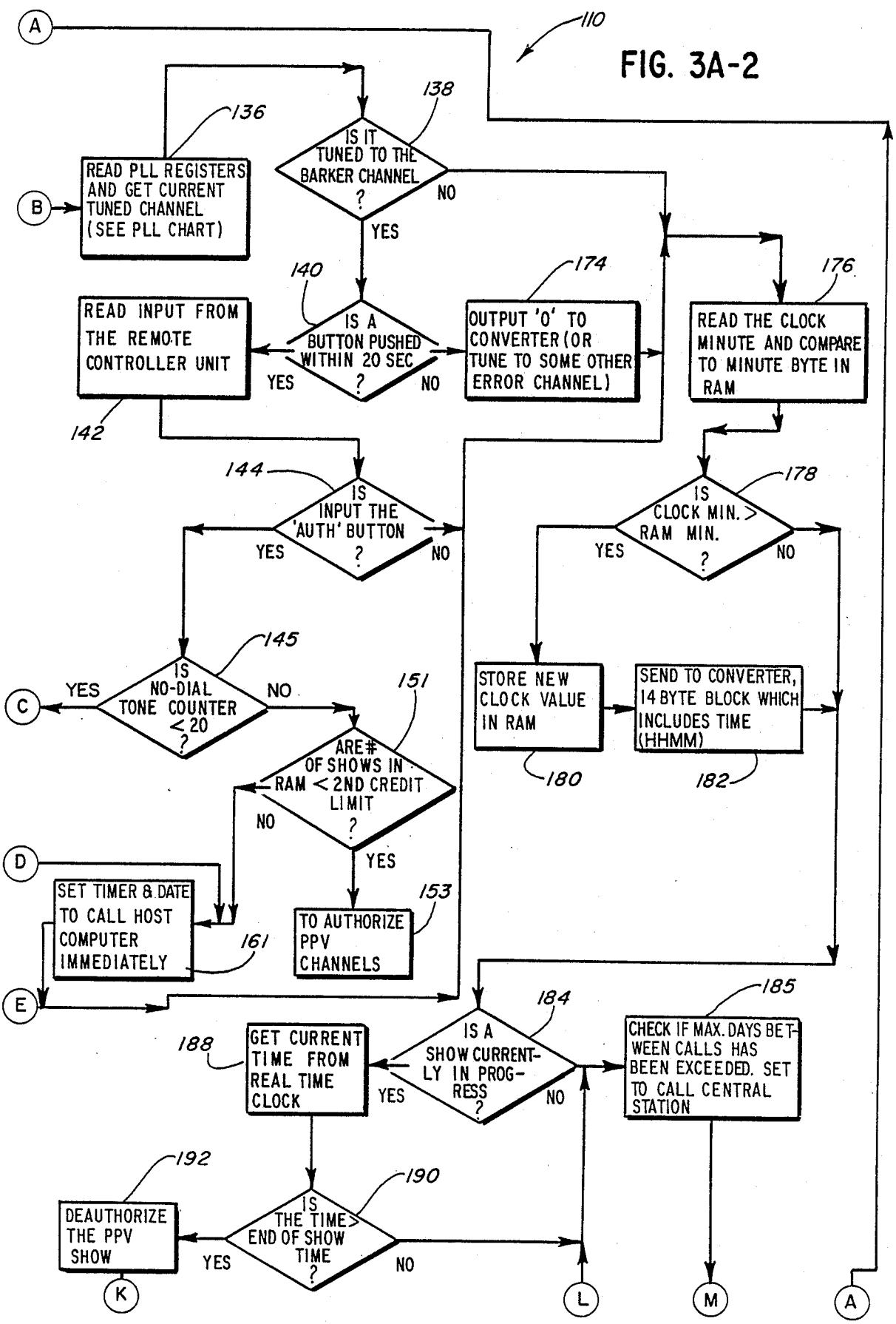
Figures 3, 3A:
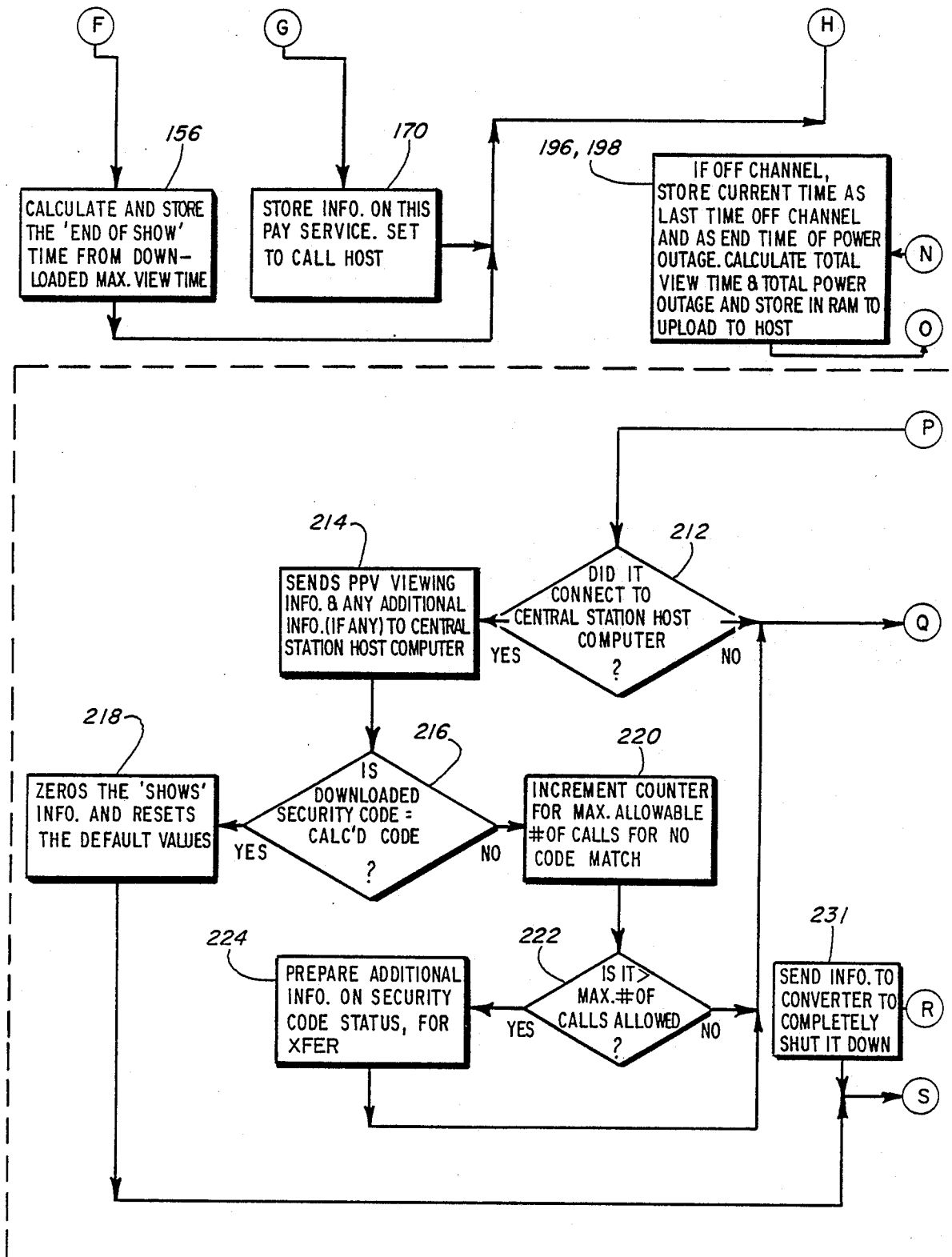
Figures 3, 3A, 4:
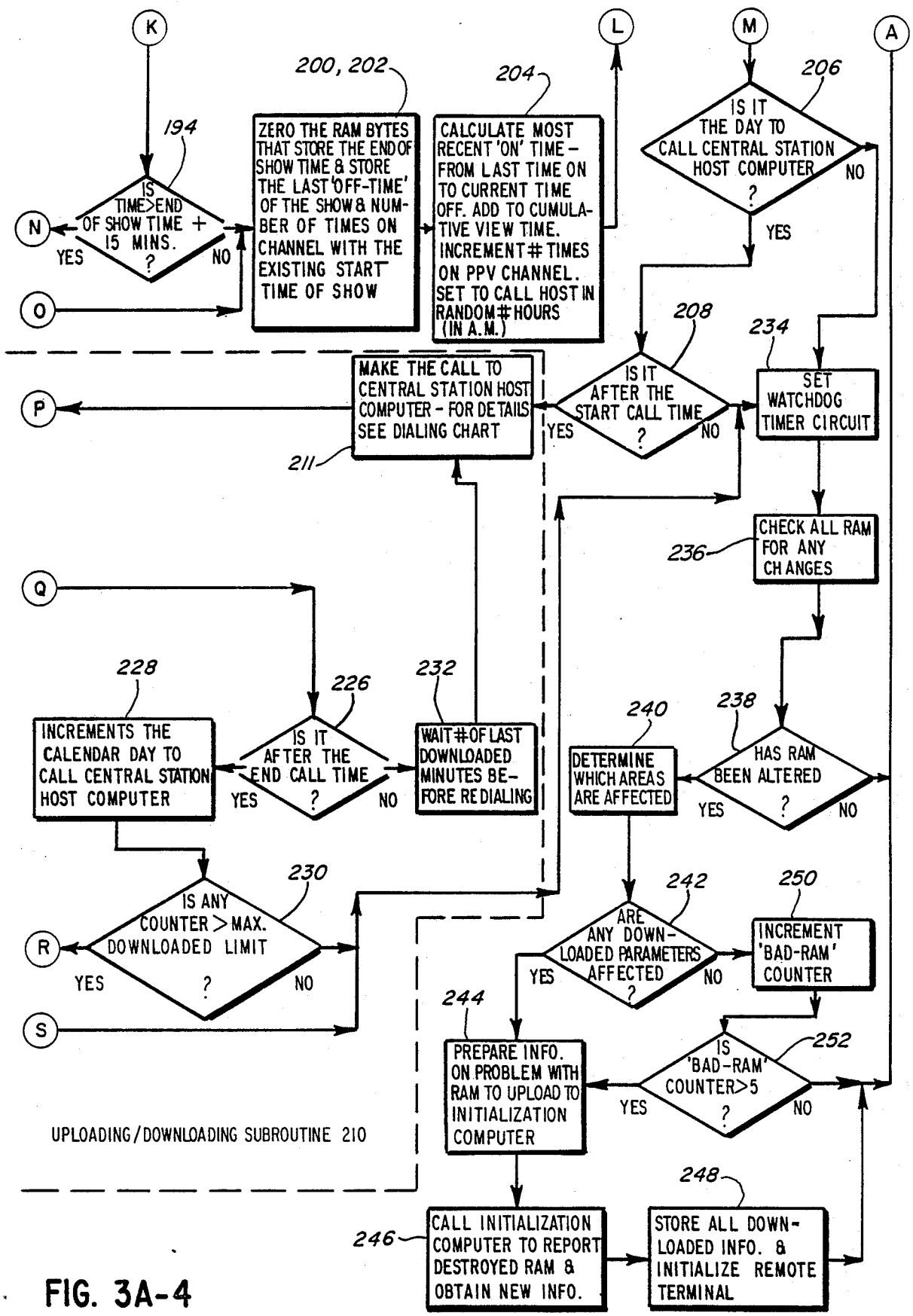

The operation of the remote terminal 10 of this invention will be explained with respect to the computer programs, shown in FIGS. 3, as stored in the ROM 34 and executed by the microprocessor 24 of FIG. 1A. The operating software in the form of the main program 110 is shown in FIG. 3A. The main program 110 is initiated in step 112 and after a cycle or loop there through returns to step 112. Thereafter, step 114 searches for any input from the remote control unit 15 of the converter 14, as would be entered by actuating selected of its buttons on the panel 17. If yes, such inputs are applied via the data buffer 20 and the parallel input/output interface 26 to the microprocessor 4 by step 116 to be further examined. Step 118 determines whether the remote control input is that derived from the actuation of the button on the panel 17, whose actuation enables the converter 14 to receive a coded identification or password of the viewer and to disable the converter 14 from making a channel selection. If the C/R button on the panel 17 was actuated, step 120 determines the numeric value which the viewer enters upon the 0–9 buttons on the panel 17 of the remote control unit 15. Next step 122 determines whether the numeric value of the entered password as would uniquely identify the viewer and his/her remote terminal 10, matches that personal identification number (PIN) as stored in the RAM 38 of the remote terminal 10. If there is a match, step 124 stores the next set of data as entered upon the 9–0 buttons on the panel 17 as may be indicative of a purchase order for an item displayed upon the subscriber's television set 16 and stores that numeric value within RAM 38 for transmission, as will be explained below, to the central station 11. Thus, the C/R button on the panel 17 may be used to enable a variety of other functions for the remote terminal 10 including at-home shopping, responding to polling questions as may be displayed upon the television set 16 and other similar activities. If the entered numeric value does not match the PIN as decided by step 122, the program restores the display and moves to step 136.

If the C/R button on the panel 17 was not actuated as decided by step 118, the main program 110 moves to step 126, which determines whether the # button on the panel 17 has been actuated to deauthorize any previously authorized pay per view TV program. If the # button on the panel 17 was actuated, step 128 applies a command signal via the parallel input/output interface 26 and the data buffer 20 to the converter 14 to terminate the decryption or descrambling of the pay per view TV program signal as transmitted via the coax cable 12. Further, step 128 zeros that counter or timer as formed within RAM 38 to accumulate the show time or interval that a particular pay per view TV program is on; the show time as well as an off time, i.e. the day, hour and minute at the termination of the pay per view TV program, are transferred to designated locations within the RAM 38 and saved for later transmission as a part of a report message to that host computer at the central station 11. Next, step 130 retrieves from RAM 38 the previously entered on-time as was stored therein upon the last authorization of a pay per view TV program or resetting of the buttons on the panel 17 to a previously authorized pay per view channel and subtracts that last on-time from the current or last off-time to calculate the additional viewing time of an authorized pay per view TV program. The most recently calculated show time is entered in a designated RAM location and added to the previously accumulated show time. A further designated RAM location counts the number of times that a pay per view TV program or channel has been turned on or authorized and that count is incremented. Finally, step 130 initiates a program for randomly generating a time interval in terms of hours or minutes, at which the remote terminal 10 will effect a call to and transmit a report message to the central station 11; that randomly generated call-in time will be stored in RAM 38 for further use as will be explained. After step 130, the program moves to step 136.

If the # button on the panel 17 was not actuated as determined by step 126, step 132 determines whether the "dot" button on the panel 17 was actuated. The "dot" button on the panel 17 is used to initiate a particular function such as to cause a forced dialing or initiate the transmission by the remote terminal 10 of a message to the central station 11. If the "dot" button on the panel 17 was actuated, step 134 examines the numeric values as entered by the 0-9 buttons on the panel 17 of the remote control unit 15 to determine the type of call to be made, if any. Thereafter, the program moves to step 136.

If none of the buttons on the panel 17 of the remote control unit 15 have been actuated as determined by step 114 or upon the completion of each of the steps 122, 124, 130, 134 or if step 132 has determined that the dot button 117 has not been actuated, the main program 110 moves to step 136, which causes the microprocessor 24 to access the channel PLL data register 22 to determine to which channel the subscriber's television set 16 is currently tuned. Next step 138 examines the determined cannel to see if it is the "Barker Channel". Provision is made in the TV programs transmitted by the coaxial cable 12 to the converter 14 for one channel, known as the "Barker Channel", that contains television signals providing a display upon the television set 16 in the nature of an advertisement of the pay per view TV programs that are being offered to the viewer. If the converter 14 is tuned to that "Barker Channel" as decided by step 138, step 140 initiates a waiting period, e.g., 20 seconds, within which the viewer may actuate the AUTH button on the panel 17 of the remote control unit 15, whereby the converter 14 is commanded to descramble or decrypt the encoded pay per view TV program signal as transmitted on the coax cable 12. If the AUTH button on the panel 17 was not actuated within this waiting period, the program moves to step 174 to cause the microprocessor 24 to apply a command signal via the parallel input/output interface 26 and the data buffer 20 to the converter 14, causing it to terminate the descrambling of the inputted pay per view TV program signal and to provide a suitable error display upon the subscriber's television set 16, before continuing with the main program 110.

On the other hand if any button on the panel 17 was actuated within the waiting period, step 142 identifies which button on the panel 17 was actuated and inputs that data to the microprocessor 24 from the remote control unit 15. Next step 144 compares the inputted button actuation data to determine whether an 'AUTH' button on panel 17 was actuated. The home viewer may wish to prevent others without his/her personal identification number (PIN) from authorizing pay per view programs on his/her remote terminal. In such case, the home viewer would need to enter his/her PIN in order to authorize a pay per view digit password by actuating the buttons on panel 17 before step 144 would permit an authorization. If the inputted PIN matches the internal number stored in RAM 38, or if no PIN is required and the 'AUTH'button is actuated, the main program 110 enters a sequence of steps that determine whether the remote terminal 10 will permit authorization of a pay per view program based upon a credit limit extended to a viewer and upon whether there is an indication that the viewer has attempted to defeat the monitoring and reporting of the pay per view TV program data to the host computer at the central station 11. Each viewer has a credit limit in terms of the number of or extent of viewing of the pay per view TV programs that he/she will be permitted to view before the remote terminal 10 will fail to provide an authorizing command to the converter 14, thus preventing the further authorizing and descrambling of the pay per view TV programs. Normally, after each authorization of a pay per view TV program, the remote terminal 10 will access the data indicative of the number of authorized pay per view TV programs and formulate that data into a report message to be transmitted over the telephone lines 18 to the host computer at the central station 11. It is contemplated that home viewers may attempt to defeat the transmission of such a report message by disconnecting the telephone lines 18 from the remote terminal 10. If the phone lines 18 weren't connected or possibly the telephones were defective, the dial tone normally generated upon the telephone lines 18, would not be detected by the remote terminal 10. As will be explained, the remote terminal 10 will repeatedly attempt to transmit the report message to the host computer and will count the number of no-dial tones sensed. If the count of no-dial tones exceeds a limit as determined by step 145, step 151 determines whether the number of authorized pay per view TV programs stored in the RAM 28 is less than a second, relatively low credit limit and, if less, the main program 110 proceeds through steps 153 and 149 to step 155 to continue the authorizing of a particular pay per view TV program. If the number of no-dial tones sensed is less than the limit as determined in step 145, step 147 determines whether the number of authorized pay per view TV programs is equal to or greater than a first, relatively high limit and, if so, the main program 110 continues without authorizing the pay per view TV program. In particular, if either step 147 or 151 exceeds its limit, then step 161 sets the current time as the day, hour, and minute to call the central station host computer to report the viewing information, before the main program 110 continues in step 176 without authorizing the pay per view program.

However, if the number of authorized pay per view TV programs is less than the first, relatively high limit, the main program 110 moves to step 155, which determines if the converter 14 is using the channel or a tag mode of descrambling. In the tag mode, a tag number identifying a particular pay per view program and its channel is embedded with the TV program signal, thus permitting the use of channels other than those normally dedicated to pay per view channels, for transmitting pay per view programs. If the tag mode is enabled, step 157 determines the correct tag number and sends a command signal via the parallel input/output interface 26 and the data buffer 20 to cause the converter 14 to descramble the inputted pay per view TV program signal or decrypt with the embedded tag number. However, if the converter 14 is enabled for channels, step 146 sends a command signal via the parallel input/output interface 26 and the data buffer 20 to cause the converter 14 to descramble or decrypt the inputted pay per view TV program signal. Next, step 148 accesses the channel data register 22 to determine to which channel the converter 14 is tuned. Then, step 150 determines whether the access channel data is a pay per view channel and, if yes, step 152 causes the microprocessor 24 to transmit to the converter 14 a command signal deauthorizing all pay per view channels, except for that pay per view channel to which the converter 14 is presently tuned.

As noted above, the RAM 38 has a designated set of locations for receiving data pertaining to the authorized pay per view TV program including the on-time at which the pay per view TV program was authorized and the corresponding channel number of the authorized TV program. Step 154 accesses the channel data register 22 and stores the on-time, and the channel number or the tag number (if present) of the pay per view TV program just authorized, in a report message area of RAM 38. As will be explained later, at the call-in time as randomly calculated by step 130, the main program 110 will access this report message area in RAM 38 and transmit the accumulated program data as the report message to the host computer at the central station 11. Further, step 154 increments a counter formed in the RAM 38 which counts the number of pay per view TV programs that have been authorized. As explained above, the number stored in that counter is compared in steps 147 and 151 with relatively high and low credit limits respectively to determine whether to proceed or not with the authorization of the pay per view TV program. Next, step 156 calculates and stores the "end of show" time indicative of that real time in terms of day, hours and minutes at which the authorized pay per view TV program will end. As will be further explained, the viewing time or length of each pay per view TV program (or a maximum length of all of the pay per view TV programs) is transmitted or downloaded from the central station 11 to the remote terminal 10 and stored within a designated RAM location. Step 156 accesses that RAM location and the real time clock 40 to determine the present real time and calculates the "end of show" time by adding the current time and the downloaded viewing time. After step 156, the main program 110 proceeds to step 176.

If the selected channel is not a pay per view channel as determined by step 150, the main program 110 moves to step 158, wherein all of the pay per view channels are deauthorized. Next, step 160 examines a specified location in the RAM 38 to determine whether a pay channel flag has been set, indicating the availability for authorization of other pay channels. For example, the program source may offer pay channels (other than pay per view channel), which provide a monthly schedule of TV programs for a set monthly fee. If a pay channel flag has been set, step 162 sends a command to the converter 14 to authorize all of the other pay channels. Next, step 164 assesses the channel data register 22 to determine to which channel the converter 14 is tuned. Next, step 166 determines whether the tuned channel is a pay channel and, if not, step 172 deauthorizes all pay channels not currently subscribed to. If the channel is a pay channel as decided in step 166, step 168 deauthorizes all of the other pay service channels, before step 170 stores the authorized pay channel into a designated RAM location and sets randomly a call-in time for the remote terminal 10, which at a later time accesses the pay channel information and formulates it into a report message to be transmitted into the host computer. It is understood that the report message containing the other pay channel program data need not be combined with the report message bearing the pay per view channel data and, thus, may be transmitted at a different time.

After the main program 110 has determined whether or not the AUTH button on the panel 17 has been pressed, and it has been determined by step 138 that the converter 14 is not tuned to the "Barker Channel", the main program 110 moves to step 176, which initiates the updating of the current minute data and in particular, accesses the current minute as stored in RAM 38 and the minute data as read from the real time clock 40. Next, step 178 determines whether the minute data from the real time clock 40 has changed to the next minute and would thereby be greater than the previously stored RAM minute data and, if so, step 180 stores the new minute data in the RAM 38. Thereafter, step 182 causes a the microprocessor 24 to transmit a time signal to the converter 14 with the updated minute data.

After checking and if necessary updating the minute data, the main program 110 proceeds to step 184, to determine whether a pay per view TV program is currently authorized and, if yes, step 188 accesses the real time clock 40 to obtain the current time in day, hours and minutes. Then, step 190 determines whether the current time is greater than the "end of show" time as calculated in step 156. If greater, step 192 causes the microprocessor 24 to transmit to the converter 14 a command deauthorizing the presently authorized pay per view TV program.

It is contemplated that a viewer may attempt to defeat the monitoring and reporting functions carried out by the remote terminal 10 by first actuating a pay per view TV program and then disconnecting the power between the remote terminal 10 and the cable converter 14 to remove power from the remote terminal 10 at a point in time before the end of the preview. To detect such deactuation, the main program 110 moves to step 194, which determines whether the current time as obtained from the real time clock 40 is greater than the calculated "end of show" time plus an acceptable time interval. The acceptable time interval accounts for possible power outages due to causes other than viewer intervention. In an illustrative example, an acceptable interval of 15 minutes is added on to the calculated "end of show" time to account for the occurrence of a power outage and return. If a power outage did occur and returned within this interval 15 minutes, the main program 110 will continue with step 200. However, if the real time clock 40 as continuously energized by the back-up battery 46 indicates that the real time exceeds the calculated "end of show" time by the acceptable interval, step 196 stores the current real time as the last off-time that the pay per view channel has been turned off or deauthorized, into the return message area of the RAM 38. Step 196 first determines if the converter 14 has been tuned off the authorized pay per view channel. Further, step 196 stores in a designated location of RAM 38 the current time or the power-on time, indicative of the time in day, hours and minutes that owner was restored to the remote terminal. Step 196 then calculates an energization removal interval (or power outage time) as the difference between the power-on and power-off times; the energization removal interval is then stored in the report message area of the RAM 38, to be subsequently transmitted to the host computer.

If the real time does not exceed by the acceptable interval the calculated "end of show" time or step 196 has been completed, the main program 110 moves to step 200, which erases from RAM 38 the last "end of show" time, and stores the current real time as obtained from the real time clock 40 (corresponding to the occurrence of the "end of show" as determined by step 190 or the time that power has been reapplied to the remote terminal as determined by step 194) into the return message area of the RAM 38, as the last off time of the authorized pay per view TV program. Then, step 204 prepares the report message to be transmitted to the central station 11. In particular, step 204 calculates the most recent on-time of a pay per view TV program by accessing the last on-time or instant that a pay per view program was authorized and subtracts that last on-time from the last off-time to calculate the show time. Noting the possibility that a viewer may repeatedly authorize and deauthorize a particular program, the most recent viewing or show time is then added to the previously calculated show time(s) as stored in RAM 38. Next, step 204 increments the RAM counter location keeping track of the number of times that a particular pay per view TV program has been authorized or turned on. Finally, step 204 executes a random time generating sub routine to set on a random basis that time at which the remote terminal 10 will call and transmit its report message to the central station 11.

After the processing of a pay per view TV program by steps 190 or 204, or it has been determined that no pay per view TV program is presently authorized in step 184 by the converter 14, the main program 110 moves to step 206 to initiate the transmission of the report message to the host computer at the central station 11. Initially, step 206 accesses the real time clock 40 to determine the current day and time, and compares the current day and time to that call-in time as previously calculated in steps 130 and 204. If it is the day to call-in, step 208 further compares the current hour and minute to the previously calculated hour and minute. If the day or hour/minute has not arrived, the program exits to step 234, as will be described later. If the randomly generated day and time for call-in has occurred, the program moves to the uploading/downloading subroutine 210, wherein step 211 causes the microprocessor 24 to actuate the serial interface 36, and the modem 44 and the DAA 48, as will be explained with respect to FIG. 2B. Next, step 212 accesses the modem 44 to determine whether a response signal in the form of a carrier signal has been received from the host computer at the central station 11. If a carrier signal has been received from the central station 11, step 214 accesses the return message areas of the RAM 38, downloading the return message to the serial interface 36, whereby it is transmitted via the modem 44 and the DAA 48 to the central station 11.

The main program 110 is now in its uploading/downloading subroutine 210, which not only initiates transmission of the report message and receives the command message, but also provides security against the viewer or a third party from intercepting and/or interfering with any control message transmitted or downloaded from the central station 11 to the remote terminal 10 or with a return or report message as transmitted or uploaded from the remote terminal 10 to the central station 11. The messages transmitted between the remote terminal 10 and the central station 11 include a security code, which is recalculated or generated once for each cycle of transmitting and receiving messages between the remote terminal 10 and the central station 11. Each of the remote terminal 10 and the host computer at the central station 11 includes a pseudo random generator. The corresponding generators of the remote terminal 10 and the host computer 11 generate respectively first and second streams of pseudorandom numbers that form the security codes. Once in each cycle of transmission and reception of messages between the remote terminal 10 and the central station 11, each of these generators is incremented to generate the next number or code in its stream and thus the first and second streams are said to be congruent with each other. The next pseudorandom number or security code is transmitted in the downloaded command message from the host computer and is received and stored by the remote terminal 10 in its RAM 38. Upon transmission of the return message by step 214, step 216 accesses the downloaded security code and compares it with that security code or pseudorandom number as last generated within the remote terminal 10. If they compare, step 218 erases the data pertaining to the authorized pay per view TV program(s) as just transmitted in step 214 to the central station 11, and calls that pseudorandom number sub routine in the main program 110 to generate the next pseudorandom number or security code in its stream, to be compared upon the transmission of the next return message to the central station 11. If the downloaded security code does not match the most recently calculated code in step 216, the main program 110 moves to step 220, which increments a counter formed in the RAM 38 for counting the number of times a match within step 216 has not been achieved. Next, step 222 determines whether the number of such mismatches exceeds a predetermined number or limit and, if so, step 224 generates and stores a flag or signal indicative of such mismatches into the return message area of the RAM 38, to be transmitted with the return message to the central station 11. After the preparation and loading of the code mismatch flag or if the predetermined number of mismatches has not been exceeded as determined by step 222, the main program moves to step 226. If a return signal from the central station 11 is not received by the remote terminal 10, step 212 increments a counter in the RAM 38 totaling the number of times that there has been no response from the central station 11 and directs the main program 110 to step 226. The failure of the central station 11 to transmit its downloaded control message to the remote terminal 10 may be due to failure of the central station 11, interference upon the telephone lines 18 or due to the intervention of the viewer as by disconnecting his telephone lines 18 from the remote terminal 10 in an attempt to defeat the monitoring by the remote terminal 10 of the program data and the transmission of the report message to the host computer. As will become evident, the remote terminal 10 is programmed to periodically initiate its dialing procedures to transmit its report message. If the failure to transmit the return message exceeds a predetermined number, it is assumed that the viewer is attempting to defeat the transmission of the report message as will be detected by the main program 110 in a manner as will now be explained. Steps 130 and 204 generate randomly the call-in time, at which time the remote terminal 10 initiates the transmission of the report message. If for any reason, the remote terminal 10 does not receive a response from the central station 11, it will initiate after a predetermined time (in minutes) the retransmission of the report message. Such redialing will continue for a predetermined length of time and if not successful, the call in time will be set for a subsequent day. Initially, step 226 accesses the real time clock 40 and compares the current time to determine whether it is within that window defined by the call-in and end of call-in times for return message transmission and if the current time has exceeded the end of call time, step 228 increments the call-in time to the subsequent day. Next, step 230 compares each counter as formed in RAM 38 with its predetermined limit. For example as will be explained, counters have been established for counting the number of failures for the central station 11 to respond to a report message and the number of times that there has been a failure to match a calculated security code with a downloaded code. Typically, these maximum counts or limits are downloaded or transmitted in the command message from the central station 11 to the remote terminal 10. If any of these downloaded limits are exceeded as determined by step 230, step 231 sends a command to the converter 14 disabling it from tuning any channel whether a pay per view TV program or not. Thus, the viewer who has most likely been tampering with the remote terminal 10 will be forced to communicate with the source or promoter company providing the pay per view television program service in order to have his/her viewing service restored.

If the current time is not greater than the end of call-in time as determined by step 226, step 232 sets a delay period, typically in terms of minutes, before subroutine 210 initiates the next transmission of the report message. As indicated above, the remote terminal 10 will attempt to transmit a report message periodically until the end of call-in time has passed. In an alternative embodiment of this invention, steps 226 and 228 may be eliminated, whereby the uploading/downloading subroutine 210 may move directly from step 212 to step 230, whereby the remote terminal continues to periodically transmit the report message over the telephone lines 18 to the host computer, until any of the counters as would measure the number of attempts at transmission of the report message have exceeded their limit, as detected in step 230.

After the time to call in has been checked by steps 206 and 208 and a security check has been performed by step 230, step 234 sets the watchdog timer circuit 30. If the main program 110 is being executed normally, the watchdog timer circuit 30 should be reset each time that the main program 110 completes its loop or cycle, i.e., each time that step 234 is executed, typically in the order of once each millisecond; however, if the main program 110 becomes hung up and step 234 is not executed, the watchdog timer circuit 30 will time out a relatively long period, e.g., two minutes, and then reset the microprocessor 24 to return the execution to the beginning of the main program 110 to execute step 114.

After the resetting of the watch dog timer circuit 30 in step 234 and before the return of the main program 110 to its initial step 114, the integrity of the RAM 38 is examined. In step 236, the contents of the RAM 38 are examined and a sum check of its contents calculated and stored in a designated area of the RAM 38. Next step 238 compares the sum check values as calculated on successive loops or cyclical executions of the main program 110 and, if the successively calculated sum checks match, i.e., the data contents of the RAM 38 has not been altered, the main program 110 returns to its initial step 114. If the contents of the RAM 38 have been altered as may typically occur by a power surge, step 240 determines which areas of RAM 38 have been altered. Next, step 242 checks to see if any of the downloaded information from the central station 11 has been affected. If it is determined that one or more of the downloaded parameters has been altered, step 244 prepares information on which parameters have been altered. Then step 246 initiates immediately the transmission by the remote terminal 10 of the prepared request message over the telephone lines 18 to an initialization computer which stores backup initialization data for each of the remote terminals 10. Next in step 248, the initialization computer will return or download a message containing the new initialization data to be stored into that area of the RAM 38 for the initialization data. After the new initialization data has been stored in RAM 38, the main program 110 returns to its initial step 114. However, if step 242 determines that none of the information sent from the central station 11 has been altered, then step 250 increments a counter in memory which counts the number of times that the calculated check sum of RAM 38 has changed. Step 252 will then determine whether this counter is greater than a given number, e.g., 5; if greater, step 244 prepares information on the value of this counter to be sent to initializing computer. If step 252 determines that the counter is 5 or less, the main program 110 returns to its initial step 114.

Figures 2, 3B:
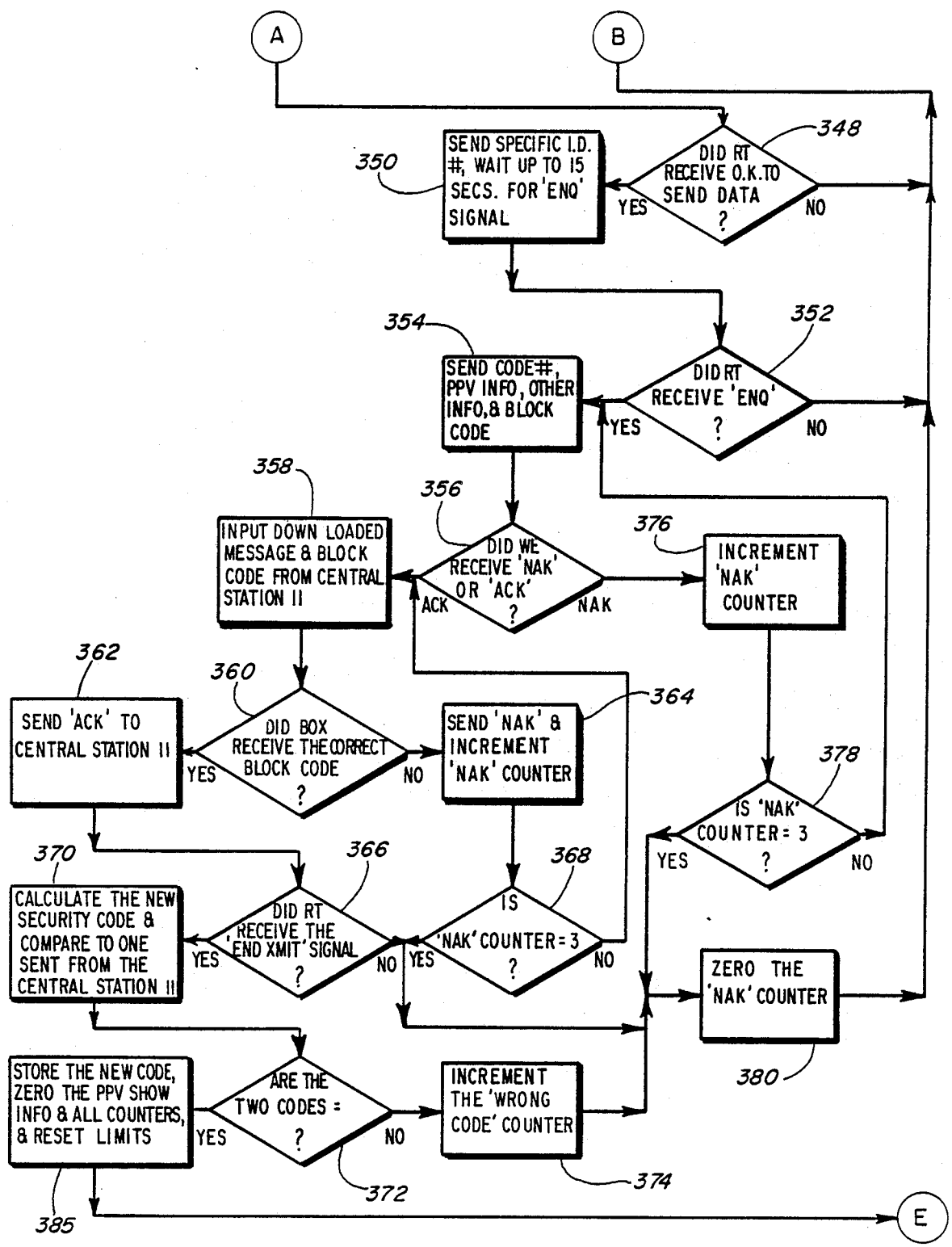
Figures 3, 3B:
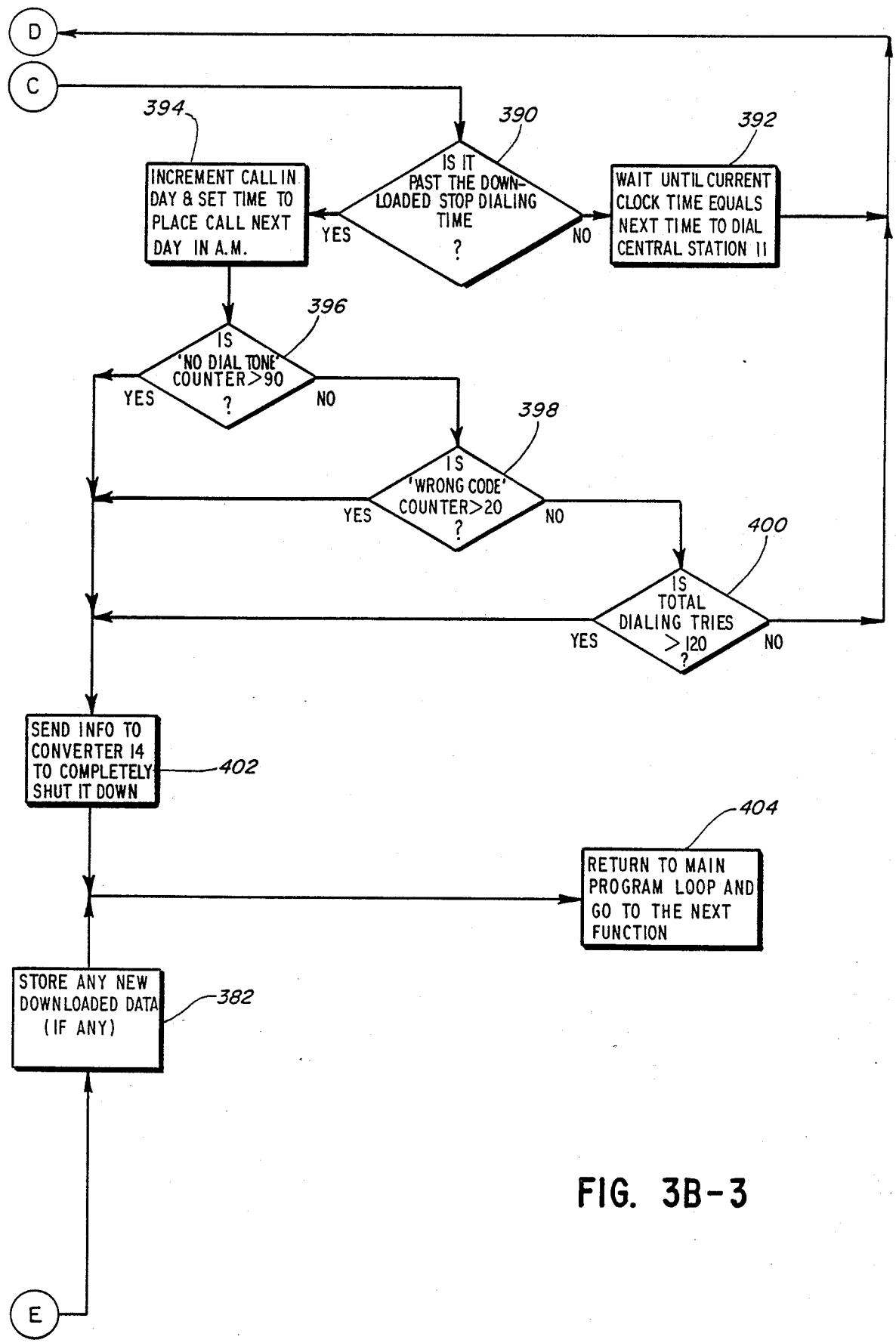
Figure 3C:
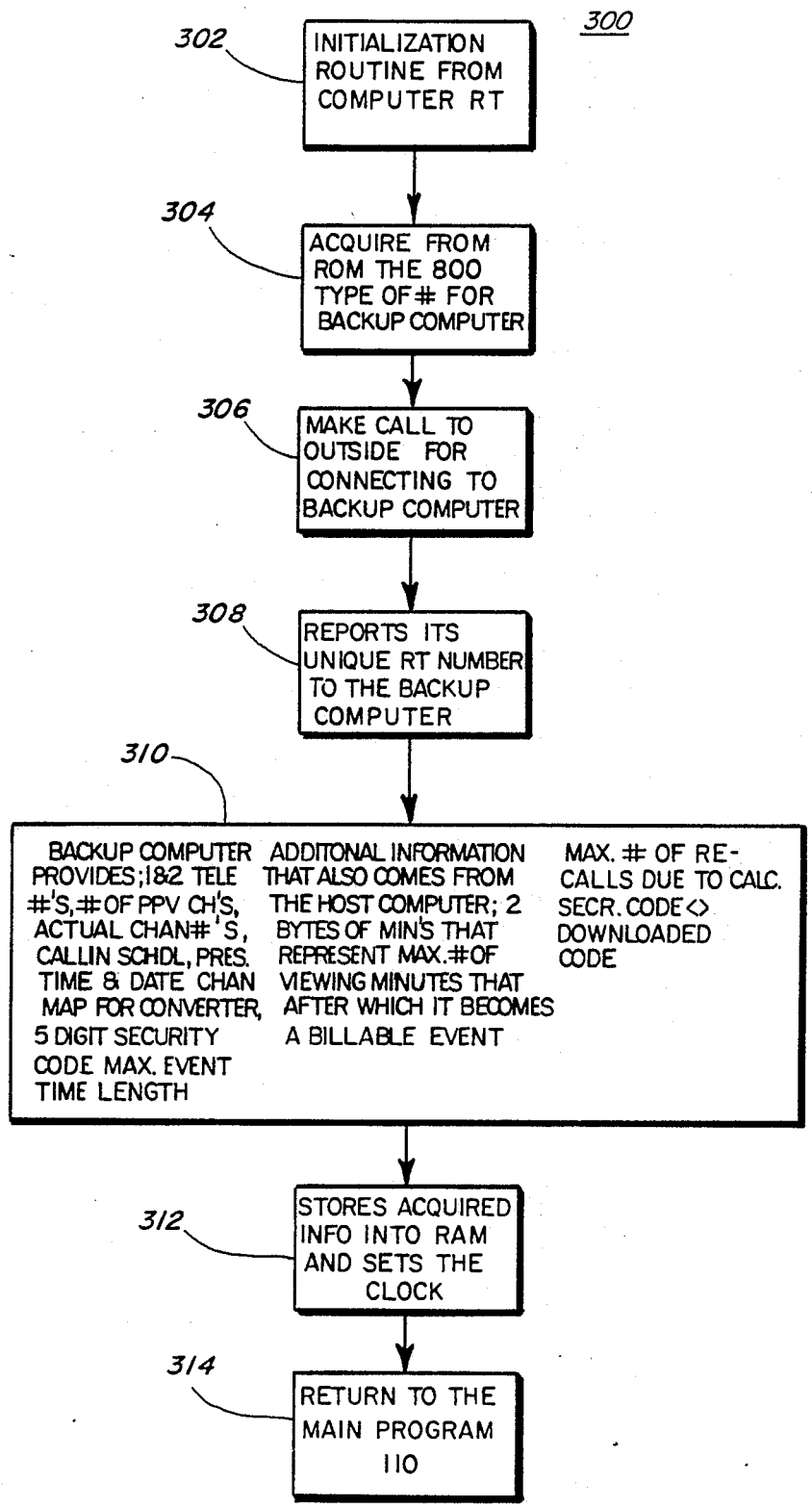

The uploading/downloading subroutine 210 generally shown in FIG. 3A is more completely explained with respect to FIG. 3B. The uploading/downloading subroutine 210 is entered when it has been decided by steps 206 and 208 that it is the day and time (hours, minutes) to initiate a call-in or upload the report message from the remote terminal 10 to the host computer at the central station 11. The subroutine 210 is entered from step 208 to step 320. Next, step 322 indicates that the real time is greater than the previously calculated call-in time to upload data. Next, step 324 prepares the report message data, which is stored in the RAM 38 and is indicative of the authorized pay per view TV programs. First, a PRELAY signal is applied to the transistor Q1 of the DAA 48, as shown in FIG. 2B, to energize the coil of relay K1 whereby the relay's contacts K1 are closed to couple the modem 44 and thus the remote terminal 10 to the telephone lines 18. Next, the DATVAL output of the call progress circuit 42, as shown in FIG. 2B, is checked to determine the phone line status and, in particular, whether a dial tone is present upon the phone lines 18. Next, step 326 examines the data output by the call progress circuit 42 upon the data bus 56 to determine whether the circuit 42 has detected the presence of a dial tone. The absence of a dial tone may indicate that the non-dedicated phone lines 18 of the viewer are busy with another call or that the viewer's phone has been disconnected. The call progress circuit 42 is capable of outputting data indicative that the lines 18 are busy, there is no answer or a dial tone is present. If no dial tone is present, step 384 increments a "no dial tone" counter, which is checked to determine the possible interference by the viewer with the monitoring and reporting functions of his/her remote terminal 10. The "no dial tone" counter, as well as the other counters as will be identified, are formed in designated storage locations of the RAM 38.

If there is a dial tone present on the telephone lines 18 as determined by step 326, step 328 compares the current count in a "no carrier counter" (as also formed in the RAM 38) with a predetermined limit, e.g., 10. The microprocessor 24 of the remote terminal 10 places a telephone call, as is well known in the art, by applying a series of pulse tones as by opening and closing the relay K1, over the phone lines 18. The telephone company responds to the series of pulse tones corresponding to a primary telephone number and directs a ringing signal move the telephone lines to the host computer, which in response turns-on its modem. In turn, the modem of the host computer transmits a return carrier signal to the remote terminal 10. The remote terminal's modem 44 senses the presence of the returned carrier signal, to generate upon its carrier detect line a CARDET signal, as shown in FIG. 2B. In the absence of the CARDET signal, the no carrier counter will be incremented. The absence of a carrier signal is indicative that a call was completed to the central station 11 and most probably that the host modem has failed to generate its carrier signal or that there has been some interruption of that signal on the telephone lines 18. If the count within the no carrier counter does not exceed the predetermined limit as determined by step 328, step 332 places a telephone call to a primary telephone number, i.e., the microprocessor generates the corresponding series of pulse tones as will be answered by a first modem of the host computer. However, if the count within the no carrier counter exceeds the predetermined number as would tend to indicate a problem in communicating with the first modem, step 330 accesses a secondary phone number from the RAM 38 and places a telephone call to a second or back-up odem, which may be associated with the same host computer or to a back-up computer. In this fashion, the failure of a modem or of a host computer will not interrupt the uploading of data from the remote terminals 10 within this system.

Next, step 334 increments a dialing tries counter formed in the RAM 38 each time that the remote terminal 10 has attempted to place a telephone call to either of the primary or secondary telephone numbers, and accesses the data output of the call progress circuit 42 to determine whether there has been a ringing signal, a busy signal or the absence of any signal on the telephone lines 18. A dialing tries counter counts the number of times that the remote terminal 10 and its modem 44 have attempted to call the host computer before succeeding. Step 336 analyzes that data input from the call progress circuit 42 and if busy as indicative that all of the non-dedicated telephone lines to the host computer are busy, step 338 increments a busy center formed in the RAM 38 to provide an indication of the number of busy signals detected, before proceeding with a re-transmission procedure, as will be explained. The lack of a signal may be indicative that the telephone lines 18 are disconnected from the remote terminal 10 as would defeat the monitoring and reporting functions thereof, that the viewer's telephone is busy or that the viewer's telephone is malfunctioning. Also, if no signal is present as detected by step 336, the sub-routine 210 also proceeds to effect a retransmission. Most likely, no answer will be detected on the telephone lines 18 if the viewer's telephone is defective or the microprocessor 24 of the remote terminal 10 has been interrupted as it places its pulse tones on the telephone lines 18, as when the viewer has decided to preempt the use of the telephone during the generation of the pulse tones. If a ringing signal is detected by step 336, step 340 initiates a waiting period, e.g., 30 seconds, for the modem associated with the host computer o answer and send back its carrier signal. Next, step 342 determines whether a carrier has been received by the modem 44 before the expiration of the wait period. If the wait period has expired without receiving a carrier, step 344 increments the no carrier counter, before proceeding with the procedure for initiating the retransmission of the report message.

If a carrier has been received from the central station 11 as decided by step 342, step 346 initiates a delay period, e.g., 2 seconds, to permit identification of a calling telephone number, before transmitting a start code illustratively comprised of two characters as indicative of the baud rate and the length of each byte of the uploaded report message, and the parity coding employed, to the host computer. Thereafter, step 346 initiates a wait period within which the host computer can receive and respond with an o.k. or control Q signal indicative that the host computer is now ready to receive the report message. Step 348 determines whether the control Q is received by the remote terminal 10 within the permissible period an, if not, the routine 210 proceeds to effect a retransmission of the report message at a later time. If the control Q signal is timely received by the remote terminal 10, step 350 transmits identification information; illustratively, such information may include an I.D. indicative of the particular remote terminal 10 and its viewer and a second I.D. as indicative of the particular program source or cable company providing the pay per view TV programs. Thereafter, step 350 initiates a further wait period within which the host computer may respond with a "ENQ" signal. The host computer receives the I.D. information transmitted from the remote terminal 10 and compares it with terminal and program source I.D.'s within its storage memory to determine whether valid or not; if valid, the host computer transmits the "ENQ" signal indicative that the remote terminal is authorized and enabling further operation of the remote terminal 10.

Next, step 352 determines whether the remote terminal 10 has received the "ENQ" signal and, if not, the sub-routine 210 proceeds to effect a retransmission of the report message. If received, step 354 responds by transmitting the report message. As explained above, the main program 110 monitors the activity of the converter 14 and records in the designated message area of RAM 38, data pertaining to the authorized pay per view TV programs, the security code repeatedly calculated as indicated above, additional information as would identify attempts to defeat the monitoring and reporting functions of the remote terminal 10 and a block code in the form of a check sum of the data within this report message. The report message is transmitted or uploaded from the remote terminal 10 to the central station 11, where at its host computer receives the report message and performs a parity check using the block sum check; if the block sum check is valid indicating that the report message has been transmitted intact, the host computer will download or transmit back to the remote terminal 10 an acknowledgement signal "ACK". On the other hand, if the check sum does not agree with the data of the report message indicating possible distortion of the transmitted message, the host computer at the central station 11 will transmit a non-acknowledgement signal "NAK".

Step 356 determines whether an "ACK" or a "NAK" signal is received by the remote terminal 10. If a "NAK" signal is received, step 376 increments a "NAK" counter formed in the RAM 38. The uploading/downloading sub-routine 210 will effect a repeated transmission of the return message a given number of times, e.g., 3, before waiting and attempting a retransmission at a later time. To that end, step 378 determines whether the "NAK" counter is equal to three or not; if not, the sub-routine 210 returns to step 354 to attempt immediately a retransmission of the report message. If the report message has been transmitted the permissible number of times, i.e. the "NAK" counter is equal to three as determined by step 378, step 380 zeros the "NAK" counter before implementing a delay period and a subsequent retransmission of the report message.

When the host computer at the central station 11 successfully receives the report message, it in turn generates its "ACK" signal and a control message to be transmitted or downloaded to the remote terminal 10. The control message includes a new security code calculated by the host computer as explained above, a fresh credit limit and a block code derived as a result of a sum check of the control message. Typically, if a viewer's credit record is maintained by the timely payment of the billed pay per view TV programs and there has been no indication of interfering with the monitoring and reporting functions of the remote terminal 10, the host computer will provide a normal credit limit in terms of the number of pay per view TV programs that the viewer will be allowed to authorize. However, if the viewer's payment record is tardy, the credit limit may be reduced to a lesser number of programs or to zero in the case where the viewer has fallen seriously into arrears on payment or there has been an indication that the viewer has attempted to defeat the normal functioning of the remote terminal 11. In serious situations, the control message may include additional information such as a command that will defeat the entire operation of the converter 14 even for viewing ordinary TV programs other than pay per view TV programs. Further, the return message may include such other information as new limits as may be entered into the various RAM counters, which will tighten the security as to the number of occurrences of the various functions before the viewer is denied access to pay per view TV programs or the converter 14 is entirely disabled.

The control message is transmitted from the central station 11 via the phone lines 18 to the remote terminal 10 to be initially stored in a temporary buffer in RAM 38. The step 356 responds to the receipt of an acknowledgement signal "ACK" by inputting the control message currently stored in the temporary buffer in RAM 38, into other designated areas of the RAM 38, for later use. Next, step 360 performs a sum check of the control message and, if it agrees with the forwarded sum check, step 362 causes the remote terminal 10 to transmit its acknowledgement signal "ACK" to the host computer, which in turn generates an end of transmit signal indicating the reception of the "ACK" signal from the remote terminal and that the host computer has ended the transmission of its control message to the remote terminal 10. If there has been distortion within the control message as indicated by step 360, step 364 will increment the "NAK" counter. Step 368 will determine whether the "NAK" counter is equal to three or less; if less, the sub-routine 210 returns to step 358 to cause a subsequent control message to be transmitted or downloaded to the remote terminal 10. However, if there has been three unsuccessful transmissions or downloading of the control message to the remote terminal 11, the sub-routine 210 will zero the "NAK" counter by step 380 before initiating a delay and a subsequent transmission of the report message at that later time.

The uploading/downloading sub-routine 210 includes steps to detect the interception of the command or report messages and the generation and application of messages by the viewer as would falsely report the authorized pay per view TV programs to the host computer. Each of the report and control messages has a security code imposed thereon, which is periodically updated upon each downloading and uploading of data. Step 366 determines whether the remote terminal 10 received an end of transmit signal from the host computer. If not, the sub-routine 210 proceeds to effect a predetermined delay before attempting to retransmit the report message to the central station 11. If the end of transmit signal has been received, step 370 calls a sub-routine to calculate the next security code or pseudo-random number in its congruent stream, as explained above. Then, step 370 accesses that security code as transmitted with the most recently received control message and compares it with the newly calculated security code. Step 372 determines whether the transmitted and calculated codes match. If not, step 374 increments a wrong code counter in RAM 38, before continuing the sub-routine with a delay and an attempt to retransmit the report message. If there is a match between the transmitted and calculated codes, step 385 erases the data presently stored in the return message area of the RAM 38, before storing therein the newly calculated security code, and resetting the limits in each of the busy, no-carrier and dialing tries counters, as described above. At this point, the report message area within the RAM 38 is ready to receive and store data concerning the next pay per view TV program(s) to be authorized. Thereafter, step 382 stores any other data that has been downloaded in the control message, before returning to the main program 110 as indicated at step 404. In particular, the sub-routine 210 returns to step 234 as shown in FIG. 3A.

If there has been an unsuccessful attempt to transit a report message or receive a control message as indicated by any of the steps 326, 336, 348, 352, 356 or 366, the uploading/downloading sub-routine 210 moves to step 386, which hangs up the phone or disconnects the remote terminal 10 from the telephone lines 18 as by opening the relay switch K1 of the DAA 48 as shown in FIG. 2B. Next, step 388 accesses the real time clock 40 and adds thereto a predetermined delay period to set the next call in time. Without such a delay, the remote terminal 11 would continuously repeat (at least for a predetermined length of time) its dial in process and not permit other use of the viewer's telephone. The delay in terms of minutes before redialing is a value included within the control message as downloaded from the central station 11. Next, step 390 accesses the real time clock 40 and compares the current time with a time limit indicative of the end of the call-in time. Typically it is desired to confine transmissions for uploading of the report message to certain periods in the day such as the early morning hours. If the end of the call in time has not been reached as indicated by step 390, and exit is made from the uploading/downloading sub-routine 210 to the main program 110 and in particular to step 234. Thus, the remote terminal 10 will continue to execute the main program 110 until the new call-in time has been reached as determined by steps 206 and 208, at which time the uploading/downloading sub-routine 210 will again be entered to attempt a retransmission of the report message and a downloading of the control message as indicated in step 392.

If the current real time has exceeded the end of the call-in time as determined by step 390, step 394 increments the day of the call in time. Thereafter, the sub-routine 210 checks in step 396 whether the no dial tone counter exceeds a predetermined limit, e.g., 90. If not, step 398 determines whether the wrong code counter exceeds its predetermined limit, e.g., 20, if not, step 400 determines whether the dialing tries counter exceeds its limit and, if not, there is an exit from the uploading-/downloading sub-routine 210 to the main program 110. However, if the limits of any of the no dial tone counter, the wrong code counter, or the dialing tries counter has been exceeded as indicated respectively by steps 396, 398 or 400, the sub-routine 210 moves to step 402, which applies a defeat command to the converter 14 defeating the viewing of not only pay per view TV programs but any TV program. The limits for the no dial tone counter, the wrong code counter and the dialing tries counter may be variably set and change as new values are downloaded in the control message. After the converter 14 has been disabled in step 402, an exit is made from the sub-routine 210 to the main program 110. At this point, the new call-in time has been set either in step 388 or 394, and the main program 110 continues to execute until the call-in time has come as detected by steps 206 and 208. Until that time, the operation of converter 14 is defeated to receive any other input commands by viewer actuation 17, save for actuation of the "dot" button on the panel 17 that would force an immediate call-in to the host computer. When either a forced call-in is made or the call-in time has arrived, the remote terminal 10 will transmit its report message to the host computer and, if the viewer's credit is good, a control message including a new credit limit is downloaded to the remote terminal 10, whereby the viewer's credit limit and the limits on the counters may be reset so that the converter 14 may again be operated to authorize further pay per view programs.

Initially, the remote terminal 10 and its converter 14 are sold, leased or otherwise conveyed to a viewer by the source or promoter of the pay per view TV programs to enable the source to monitor and receive reports of the pay per view TV programs authorized by a viewer, while permitting the viewer to authorize a particular pay per view TV program without first communicating with the program source, even for initialization data. The remote terminal 10 is initially programmed, i.e., certain data is initially stored in its RAM 38, as may be unique to the particular program source or host computer. For example, the following data as may be unique to the program source or most computer is stored within the remote terminals RAM 38: (1) the primary and secondary telephone numbers of the host computer or its backup; (2) the number of pay per view channels of a particular program source and their actual channel numbers; (3) the maximum time that a remote terminal may go without initiating a call in to transmit its report message to the host computed (4) the present time and date; (5) a channel map identifying the channel numbers to which the converter 14 may be tuned with the cable channels over which various TV programs may be transmitted; and (6) the maximum viewing or show time of any pay per view TV program period. In addition, the program source will assign and store within the RAM 38 of each of the remote terminals 10 within its system, I.D. information as will identify unequally the particular remote terminal 10 and the source of the pay per view TV programs. If a viewer moves outside of the geographic area as served by a particular program source, it may be necessary in order to use again that remote terminal 10 with a new program source, to reinitialize much of the above-identified data as stored in the RAM 38 of the remote terminal.

Initialization in terms of entering initialization data into the RAM 38 of the remote terminal 10 is necessary before normal operation can commence. A first initialization is needed when the remote terminal 10 is first purchased or leased; typically, the program source has sold or leased the remote terminal 10 to the viewer and has entered the I.D. number of the remote terminal into an initializing computer, distinct from the above discussed host computer. Typically, the modem of the initializing computer has its own separate telephone number, typically an 800 number which may be called from anywhere in the United States or North America. Assuming that the remote terminal 10 has not been previously initialized and that the initialization data locations of the RAM 38 of the remote terminal 10 are void of this data, the initialization routine 300 is entered in the following fashion. In the first step 302, the power is applied to the remote terminal 10, whereby the serial interface 36 and the parallel input/output interface 26 are enabled. If the remote terminal 10 senses that the initialization data is absent from its RAM 38, it accesses in step 304 a known location in its ROM 34, containing the telephone number of the initialization computer. Next, in step 306, the remote terminal places a telephone call to the initialization computer and in step 308 transmits a message with the unique ID of the remote terminal 10 to the initialization computer. In response, the back-up computer compares the ID number with those retained in its memory. If a match is made indicating that the transmitted ID is valid, the initialization computer downloads in step 310 the initialization data as identified above. Next, step 312 inputs the data from the serial interface 36 into the initialization data location in the RAM 38, before returning to the main program 110 in step 314.

The initialization sub-routine 300 may also be entered in a different mode, as where the remote terminal has been previously initialized and data previously stored in the initialization data location of the RAM 38. Such a mode may be entered when a subscriber has moved from one geographic location as served by one program source or cable company, to a second geographic area served by another company. When the viewer plugs his/her remote terminal 10 in at its new location, the remote terminal will attempt to place telephone calls to each of the primary and secondary telephone numbers as by steps 330 and 332, discussed above with respect to FIG. 3B. If the remote terminal 10 attempts without success to call the secondary telephone number a predetermined number of times, the uploading/downloading sub-routine will exit to step 302, at which point the initialization sub-routine 300 will again access in step 304 the telephone number of the initialization computer. After entering the initialization sub-routine 300 in this fashion, it will continue through steps 306 through steps 314 as described above.

In considering this invention, it should be remembered that the present disclosure is illustrative and the scope of the invention should be determined by the appended claims.

We claim:

1. A remote terminal for use in a system for monitoring and accumulating data indicative of viewer authorized pay per view programs on a television set at each of a plurality of remote terminals, each of said remote terminals connected by non-dedicated telephone lines for transmitting said accumulated data over said telephone lines to a host computer at a central station, said host computer processing said transmitted data to provide bills to said viewers, each of said remote terminals comprising:
   (a) means actuated by a viewer for authorizing the viewing of a pay per view program upon the television set;
   (b) means connected to said authorizing means and responsive to the viewer actuation of said authorizing means for monitoring the viewing of said pay per view program to provide program data indicative thereof;
   (c) memory means connected to said monitoring means for storing said program data therefrom; and
   (d) means connected to said authorizing means and said memory means, and responsive to said authorization for transmitting over said telephone lines to said host computer a report message including said program data.

2. The remote terminal as claimed in claim 1, wherein said monitoring means is responsive to said authorizing means for storing data indicative of each authorized pay per view program in said memory means.

3. The remote terminal as claimed in claim 2, wherein said program at a identifies each authorized pay per view program and a credit limit is stored in said memory means indicative of the extent of viewer authorizing of said pay per view programs, an there is further included means for accessing said memory means and for comparing said credit limit with said program data and, if said credit limit is exceeded, for defeating the operation of said authorizing means.

4. The remote terminal as claimed in claim 1, wherein there is further included means for receiving a control message transmitted over said telephone lines from said host computer.

5. The remote terminal as claimed in claim 4, wherein said control message includes a new credit limit, and there is further included means for receiving and storing said new credit limit in said memory means in place of any previous credit limit.

6. The remote terminal as claimed in claim 1, wherein there is further included clock for providing a signal indicative of the current real time.

7. The remote terminal as claimed in claim 6, wherein said transmitting means comprises means for randomly setting a call-in time.

8. The remote terminal as claimed in claim 7, wherein said transmitting means further comprises means for comparing said call-in time with said real time an upon achieving a match therebetween, for initiating the transmitting of said report message.

9. The remote terminal as claimed in claim 8, wherein there is included a back-up battery for energizing each of said real time clock an said memory means, in the event that normal energization of said remote terminal fails.

10. The remote terminal as claimed in claim 6, wherein there is included means for determining the projected end of program time at which a pay per view program terminates.

11. The remote terminal as claimed in claim 10, wherein there is further included means for accessing said real time clock and for comparing said accessed real time with said en of program time and, if said real time is greater than said end of program time, deauthorizing said authorized pay per view program.

12. The remote terminal as claimed in claim 11, wherein there is further included means responsive to said deauthorizing of said pay per view program for randomly generating a call-in time for said transmitting means to initiate the transmitting of said report message over said telephone lines to said host computer.

13. The remote terminal as claimed in claim 11, wherein said end of program time determining means is responsive to the viewer actuation of said authorizing means for accessing said real time clock to obtain said current real time and for calculating said end of program time as the sum of said current real time and a predetermined period of time.

14. The remote terminal as claimed in claim 13, wherein said predetermined period is set to be greater than the maximum length of time of any of said pay per view programs.

15. The remote terminal as claimed in claim 11, wherein there is include a back-up battery coupled to said memory means and to said real tie clock to provide continuous energization thereof if normal energization is remove from said remote terminal, means for accessing said real time clock to obtain said current real time and comparing said current real time with said end of program time and, if said current real time is greater than said end of program time by a predetermine erio, for adopting said current time as a power-on time corresponding to the restoration of normal energization to said remote terminal and storing same in said memory means.

16. The remote terminal as claimed in claim 15, wherein there is included means responsive to viewer actuation of said authorizing means for accessing said real time clock to obtain said current real time as an on-time indicative of a starting time of said authorized pay per view program and storing same in said memory means, and means for adopting said power-on time as a last off-time indicative of the last deauthorizing time of said pay per view program and for calculating a most recent viewing time as the difference between said on-time and said adopted, last off-time.

17. The remote terminal as claimed in claim 15, wherein there is included means responsive to the removal of the normal energization from said remote terminal for accessing said real time clock to obtain and adopt said current real time as a power-off time and storing same in said memory means.

18. The remote terminal as claimed in claim 17, wherein there is included means for calculating an energization removal period of time that normal energization is removed from said remote terminal as the difference between said power-off and said power-on times.

19. The remote terminal as claimed in claim 6, wherein there is included means actuable by said viewer for deauthorizing the viewing of an authorized pay per view program on said television set.

20. The remote terminal as claimed in claim 19, wherein there is included means responsive to said viewer actuation of said authorizing means for accessing said real time clock to obtain a first real time signal and for storing same.

21. The remote terminal as claimed in claim 19, wherein there is included means responsive to the viewer actuation of said authorizing means for accessing said real time clock to obtain a first real time and for calculating a projected end of program time as the sum of said first real time and a predetermined period, and means for accessing said real time clock to obtain a second real time, for comparing said second real time with said calculated end of program time and, if said second real time is greater than said calculated end of program time, deauthorizing said authorized pay per view TV program.

22. A remote terminal as claimed in claim 21, wherein there is further included means responsive to any of said deauthorizing of said authorized pay per view TV program for setting a call-in time for said transmitting means to initiate the transmitting of said report message over said telephone lines to said host computer.

23. The remote terminal as claimed in claim 21, wherein there is included means responsive to any of said deauthorizings of said authorized pay per view TV program for accessing said real time clock to obtain said current real time and for calculating a report message call-in time at which said transmitting means initiates the transmitting of said report message, as the sum of said current real time and a randomly determined period.

24. The remote terminal as claimed in claim 19, wherein there is included means responsive to said viewer actuation of each of said authorizing means and said deauthorizing means for accessing said real time clock to obtain first and second real times, respectively, and for storing same in said memory means.

25. The remote terminal as claimed in claim 24, wherein there is included means responsive to said deauthorizing of said pay per view TV program for calculating a current viewing time of said authorized pay per view TV program as the difference between said first and second real times.

26. The remote terminal as claimed in claim 25, wherein said memory means includes a location for accumulating and storing said current viewing times.

27. The remote terminal as claimed in claim 26, wherein said memory includes a storage location for counting and storing the number of times that a pay per view TV program has been deauthorized, and means responsive to said deauthorizing of an authorized pay per view TV program for incrementing said stored number.

28. A terminal for monitoring and accumulating data indicative of viewer authorized pay per view programs as are displayed on a television set, said terminal protected against removal of normal energization therefrom by the viewer, said terminal comprising:
 (a) a real time clock;
 (b) memory means;
 (c) means for monitoring the pay per view programs displayed upon said television set and for storing program data indicative thereof in said memory means;
 (d) a back-up battery for energizing said real time clock and said memory means if normal energization is removed therefrom; and
 (e) means operable only when normal energization is applied to said terminal for accessing said real time clock to obtain a current time, for comparing said current time with a predetermined time and, if said current time is greater than said predetermined time, adopting said greater current time as an end of viewing time corresponding to the restoration of normal energization to said terminal.

29. The terminal as claimed in claim 28, wherein there is further included means for transmitting over telephone lines to a host computer a report message including said program data; if said current time is greater than said predetermined time, said accessing and comparing means deauthorizes said authorized pay per view program; and means responsive to said deauthorizing of said authorized pay per view program for initiating at a random time later said transmitting means to transmit said report message to said host computer.

30. The terminal as claimed in claim 28, wherein there is included means responsive to the removal of normal energization from said terminal for accessing said real time clock and for storing said current time in said memory means as a power-off time, and means for calculating an energization removal period as the difference of said end of viewing and power-off times.

31. The terminal as claimed in claim 28, wherein said accessing and comparing means comprises means for setting said predetermined time according to the length of said pay per view program plus a period indicative of a power outage.

32. The terminal as claimed in claim 28, wherein there is included means actuable by a viewer for authorizing the viewing of a pay per view program upon said television set.

33. The terminal as claimed in claim 32, wherein there is further included means for responding to said viewer actuation of said authorizing means for accessing said real time clock and for adopting said accessed time as a program on-time indicative of a starting time of said authorized pay per view program, and means for calculating a viewing time of said authorized pay per view program as the difference between said adopted end of viewing time and said program on-time.

34. The terminal as claimed in claim 32, wherein there is further included means responsive to said actuation of said authorizing means for accessing said real time clock and for adopting said accessed time as a program on-time indicative of a starting time of said authorized pay per view program, and said accessing and comparing means comprises means for setting said predetermined time as the sum of said program on-time, a first period corresponding to the length of said pay per view program and a second period indicative of a power outage time.

35. The terminal as claimed in claim 28, wherein there is further included means operable when normal energization is applied to said terminal for periodically accessing said real time clock at a regular interval to obtain a current time and for storing said current time in said memory means, whereby a series of current times including a new current time and a last current time are stored in said memory means.

36. The terminal as claimed in 35, wherein said means for accessing and comparing accesses said real time clock to obtain said new current time and for comparing said new current time with said last current time stored in said memory means and, if said new current time is greater than said last current time, storing said new current value in said memory means.

37. The terminal as claimed in claim 35, wherein there is included means for accessing said memory means and for determining a difference between said new current time and said last current time, and means for comparing said difference with said regular interval and, if greater, adopting said difference as a time period of the power outage.

38. A terminal for monitoring and accumulating data indicative of viewer authorized pay per view programs to be displayed on a television set, said terminal accumulating pay per view program data in a manner to permit the viewer to preview an authorized pay per view program for a given preview period before being billed therefore, said terminal comprising:
(a) a real time clock;
(b) memory means;
(c) viewer actuable means for authorizing and deauthorizing a pay per view program for viewing on said television set, and for accessing said real time clock to obtain an on-time and an off-time corresponding to the viewer's authorizing and deauthorizing, respectively; and
(d) means responsive to successive viewer authorizing and deauthorizing for calculating a most recent viewing time segment as the difference between corresponding, successive on- and off-times, and for storing and accumulating each of said viewing time segments in said memory means to provide a total viewing time, which if greater than said preview period indicates that said viewer be billed for said pay per view program.

39. The terminal as claimed in claim 38, wherein there is included a counter for counting the number of viewing time segments and responsive to each deauthorizing for incrementing said number.

40. The terminal as claimed in claim 39, wherein there is included means for transmitting a report message from said terminal disposed at a remote location to a host computer located at a central station, said report message including said total viewing time and said number of viewing time segments, whereby said host computer may determine whether said preview period has been exceeded.

41. The terminal as claimed in claimed in claim 40, wherein there is further included means responsive to said authorizing for actuating said transmitting means to transmit said report message to said host computer.

42. A remote terminal for use in a system for monitoring and accumulating data indicative of events occurring at each of a plurality of remote terminals, each of said remote terminals connected by a detachable, non-dedicated telephone line for transmitting said accumulated event data over said telephone lines to a host computer at a central station, each of said remote terminals comprising:
(a) means for detachably connecting said remote terminal to said telephone line;
(b) memory means for storing event data indicative of said events;
(c) means for transmitting over said telephone lines to said host computer a report message including said event data;
(d) means connected to said memory means and said transmitting means for initiating said transmitting means to transmit said report message; and
(f) means connected to said initiating means and said connecting means, and responsive to said initiating means initiating said transmitting means for sensing whether the telephone line is detached from said remote terminal and, if detached, for providing a detach signal indicative thereof.

43. The remote terminal as claimed in claim 42, wherein a dial tone normally appears on said telephone lines, and said sensing means senses the presence of said dial tone to determine whether said telephone is detached from said remote terminal.

44. A system for monitoring events occurring at a plurality of remote terminals and reporting event data indicative thereof over transmission lines to a host computer disposed at a central station, said monitoring system comprising:
(a) a plurality of said remote terminals, each comprised of:
(1) means for monitoring said events to provide event data indicative thereof;
(2) memory means connected to said monitoring means for storing said event data therefrom; and
(3) transmitting means connected to said memory means and to one of said transmission lines for establishing a connection with said host computer and thereafter for accessing said event data in said memory means and for transmitting over said transmission line to said host computer a report message including said event data, said transmitting means comprising means for determining whether said connection was completed and, if not, for incrementing a number indicative of the unsuccessful transmissions of said report message, said number is stored in said memory means, and means for incorporating said number in said report message; and
(b) said host computer comprising means for receiving said report message from each of said plurality of remote terminals.

45. The monitoring system as claimed in claim 44, wherein said transmitting means of each said remote terminals comprises means for transmitting over said transmission line a dialing signal to said host computer, means for detecting a busy signal from said host computer, and means responsive to each of said busy signals for counting the number thereof and for inserting said busy signal number in said report message; and said receiving means of said host computer comprising means responsive to said dialing signal and, if not preoccupied with a return message from another of said remote terminals, for receiving said report message, and means if preoccupied for generating said busy signal.

46. The monitoring system as claimed in claim 45 wherein said receiving means of said host computer further comprises means responsive to the reception of said report message from one of said remote terminals for sending a carrier signal to said one remote terminal.

47. The monitoring system as claimed in claim 46, wherein said transmitting means of each of said remote terminals comprises means for detecting the presence or absence of said transmitted carrier signal and, if absent, incrementing a second number stored in said memory means indicative thereof and for including said second number in said report message.

48. A remote terminal for use in a system for monitoring events occurring at each of a plurality of remote terminals and reporting same to a host computer, an initialization computer for storing initializing data for each of said plurality of remote terminals and addressable by each of said remote terminals over conventional telephone lines at a first known telephone number, each of said remote terminals comprising:
 (a) means for monitoring said events at said remote terminal and providing event data indicative thereof;
 (b) memory means for storing said initializing data, said known first telephone number, and said event data;
 (c) first transmitting means for incorporating said event data into a report message and transmitting said report message to said host computer;
 (d) means for examining said initializing data in said memory means and, if defective, for providing a request transmit signal; and
 (e) second transmitting means responsive to said request transmit signal for accessing said first telephone number in said memory means and for transmitting a request message over said conventional telephone lines to said initialization computer to request the downloading of new initializing data from said host computer to said requesting remote terminal.

49. The remote terminal as claimed in claim 48, wherein said examining means examines said memory means to determine the presence or absence of said initializing data in said memory means and, if absent, for providing said request transmit signal.

50. The remote terminal as claimed in claim 48, wherein said first transmitting means transmits said report message over conventional telephone lines to said host computer at a second known telephone number and said remote terminal further comprises means for actuating said first transmitting means to initiate the transmitting of said report message to said host computer and, if said transmission between said reporting remote terminal and said host computer is not successful, for reactuating said first transmitting means of said reporting remote terminal.

51. The remote terminal as claimed in claim 48, wherein said memory means also stores an executable computer program, and there is further included a computer processor for cyclically executing said program, and said examining means responds in the course of each cyclical execution of said computer program to examine said initializing data to determine the integrity thereof.

52. The remote terminal as claimed in claim 51, wherein said initialization computer stores initializing data including a new second telephone number of said host computer, and said remote terminal further includes means for counting said unsuccessful transmission attempts between said remote terminal and said host computer and, if said number of unsuccessful transmissions exceeds a predetermined limit number, for generating a request transmit signal.

53. The remote terminal as claimed in claim 51, wherein said examining means performs in the course of each cyclical execution of said computer program a sum check on said initializing data.

54. The remote terminals as claimed in claim 53, wherein said examining means further comprises means for comparing sum checks obtained in the course of successive cyclical executions of said computer program and, if different, to provide said request transmit signal.

55. A method of monitoring and accumulating data indicative of viewer authorized pay per view programs on a television set at each of a plurality or remote terminals, each of said remote terminals connected by non-dedicated telephone lines for transmitting said accumulated program data over said telephone lines to a host computer, said host computer processing said transmitted data to provide bills to the viewers, the steps of said method comprising;
 (a) authorizing the viewing of pay per view program upon the television set;
 (b) monitoring in response to said authorizing of said pay per view program the viewing of said pay per view program and providing program data indicative thereof;
 (c) storing said program data; and
 (d) responding to the said authorizing of said pay per view program by accessing said stored program data and transmitting a report message including said program data to the host computer.

56. A method of monitoring and accumulating data at a terminal indicative of viewer authorized pay per view programs in a manner to protect the terminal against removal of normal energization therefrom, the terminal comprising a real time clock and a memory, said method comprising the steps of:
 (a) monitoring the pay per view programs authorized by the viewer and storing program data indicative thereof in the memory;
 (b) applying backup energization to the real time clock and the memory if normal energization is removed from the terminal; and
 (c) when normal energization is applied to the terminal, accessing the real time clock to obtain a current time and comparing the current time with an expected end of program time and, if greater, for adopting the greater current time as the end of program time corresponding to the restoration of normal energization to the terminal.

57. A method of monitoring and accumulating data at a terminal indicative of events occurring at the terminal in a manner to protect the terminal against removal of normal energization therefrom, the terminal comprising a real time clock and a memory, said method comprising the steps of:

(a) monitoring the events and storing data indicative thereof in the memory;

(b) applying backup energization to the real time clock and the memory if normal energization is removed from the terminal;

(c) when normal energization is applied, periodically accessing the real time clock at a regular interval and for storing the current time in the memory, whereby a series of current times including a new current time and a last current time are stored in the memory; and (d) when normal energization is applied to the terminal, accessing the real time clock to obtain the new current time and determining the difference between the new current time and the last current time and, if greater then the regular interval, providing an indication of a power outage.

58. The method as claimed in claim 57, wherein there is further included the step of adopting the difference as the power outage time when said power outage indication is provided.

59. The method as claimed in claim 57, wherein the event is viewer authorization of pay per view TV programs and there is further included the step of determining whether a pay per view program had been authorized when energization was removed from the terminal and, if so, for determining whether an expected end of program time of the authorized pay per view program is greater than the new current time.

60. The method as claimed in claim 59, wherein if the expected end of program time is greater than the new current time, storing in the memory the new current time as the end of program time of the authorized pay per view program.

61. A method for monitoring and accumulating data at a terminal indicative of viewer authorized pay per view programs to be displayed on a television set, the viewer permitted to preview an authorized pay per view program without charge for a given preview period before being billed for an authorized pay per view program, the terminal comprising a real time clock and a memory, said method comprising the steps of:

(a) responding to viewer actuation of the terminal for authorizing and deauthorizing a pay per view program and accessing the real time clock to obtain an on-time and off-time corresponding to the viewer's authorizing and deauthorizing, respectively;

(b) responding to successive viewer authorizing and deauthorizing for calculating a most recent viewing time segment as the difference between corresponding, successive on- and off-times;

(c) storing and accumulating each of said viewing time segments in the memory to provide a total viewing time; and (d) comparing the total viewing time with said preview period and, if the total viewing time is greater than the preview period, billing the viewer for the pay per view program.

62. A method of monitoring and accumulating data indicative of events occurring at a plurality of remote terminals, each of said remote terminals connected by a disconnectable, non-dedicated telephone line for transmitting accumulated data over the telephone lines to a host computer, each of the remote terminals comprising a memory, said method comprising the steps of:

(a) formulating a report message including the data and transmitting the report message over the telephone line to the host computer; and (b) at the initiation of the transmission of the report message sensing whether the telephone line is disconnected from the remote terminal and, if disconnected, provided a signal indicative thereof.

* * * * *